United States Patent
Straub et al.

(10) Patent No.: US 6,216,141 B1
(45) Date of Patent: Apr. 10, 2001

(54) SYSTEM AND METHOD FOR INTEGRATING A DOCUMENT INTO A DESKTOP WINDOW ON A CLIENT COMPUTER

(75) Inventors: Eric John Straub; Teresa Anne Martineau, both of Kirkland; Eric George Jakstadt, Woodinville; Steven Alfred Isaac, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/760,931

(22) Filed: Dec. 6, 1996

(51) Int. Cl.$^7$ .................................................. G06F 15/00
(52) U.S. Cl. ......................... 707/513; 707/501; 707/514; 709/203; 345/335
(58) Field of Search .................................. 707/513, 514, 707/515, 501; 395/200.33, 200.36, 200.48, 200.67, 107.01, 158; 709/203; 345/335

(56) References Cited

U.S. PATENT DOCUMENTS

| | | | |
|---|---|---|---|
| 4,575,579 | 3/1986 | Simon et al. | 178/4 |
| 5,305,195 | 4/1994 | Murphy | 364/401 |
| 5,347,632 | 9/1994 | Filepp et al. | 395/200 |
| 5,355,472 | * 10/1994 | Lewis | 395/600 |
| 5,469,540 | * 11/1995 | Power, III et al. | 395/158 |
| 5,491,820 | 2/1996 | Belove et al. | 395/600 |
| 5,559,945 | * 9/1996 | Beaudet et al. | 395/158 |
| 5,572,643 | 11/1996 | Judson | 395/793 |
| 5,848,412 | * 12/1998 | Rowland et al. | 707/9 |
| 5,854,630 | * 12/1998 | Nielsen | 345/352 |
| 5,859,972 | * 1/1999 | Subramaniam et al. | 395/200.33 |
| 5,890,172 | * 3/1999 | Borman et al. | 707/501 |
| 5,959,621 | * 9/1999 | Nawaz et al. | 345/329 |
| 6,061,695 | 5/2000 | Sllivka et al. | 707/513 |

FOREIGN PATENT DOCUMENTS

| | | |
|---|---|---|
| 0749081 A1 | 5/1996 | (EP) . |
| WO96/30864 | 3/1995 | (WO) . |

OTHER PUBLICATIONS

Faison, Borland C++3 Object–Oriented Programming, p.883–885, 1992.*
Oliver, Netscape 2 Unleashed, p. 22–26, 44–45, 88–89, 657, Feb. 1996.*
Shekleton, Designing for Flexibility with Multiple Document Interface, DBMS, p.1, Aug. 1994.*
Berg, Cookies nibble at your hard disk, LAN Times, p.1, Jul. 7, 1996.*
Moody, How the Net can keep you in touch with world events, Computer Weekly, p.1, May 9, 1996.*
McCathy, The Netscape Biscuit Company serves up a snack that knows you, Government Computer News, Sep. 23, 1996.*

(List continued on next page.)

Primary Examiner—Stephen S. Hong
Assistant Examiner—Cong-Lac Huynh
(74) Attorney, Agent, or Firm—Klarquist Sparkman Campbell Leigh & Whinston, LLP

(57) ABSTRACT

A system and method for displaying a rich multimedia document in the same window as a desktop window. In one aspect of the invention a client computer connects to a computer network, such as the Internet, and retrieves a channel guide or list of content providers from which a user can select one or more content providers. The client computer retrieves a document associated with a content provider selected from the channel guide. The document is integrated into the desktop window on the client computer. The document received may be an HTML document including hyperlinks for allowing a user to jump to another document (e.g., folder, FTP site, other HTML documents, etc.) associated with the hyperlink.

42 Claims, 17 Drawing Sheets

OTHER PUBLICATIONS

Glass, Cookies won't spoil your diet but might hurt Web security, InfoWorld, Jul. 15, 1996.*

Mills, Navigator 'cookies' files will monitor Web user activity, InfoWorld, Feb. 26, 1996.*

Sullivan, Are Web–based cookies a treat or a recipe for trouble?, PC Week, Jun. 24, 1996.*

Brown, Using Netscape 2, p. 153, 1995.*

Gavron et al., How to Use Microsoft Windows NT 4 Workstation, p. 31, Sep. 1996.*

Muchmore, News you choose, PC Magazine, pp. 1–26, Apr. 1996.*

* cited by examiner (Prior Art)

SYSTEM AND METHOD FOR INTEGRATING A DOCUMENT INTO A DESKTOP WINDOW ON A CLIENT COMPUTER

FIELD OF THE INVENTION

This invention relates to a windows graphical user interface, and, more particularly, relates to integrating a document into a desktop window on a client computer.

BACKGROUND AND SUMMARY OF THE INVENTION

Windowing environments have emerged as the most popular graphical user interface in the world. Windowing environments provide a multitasking, graphical-based interface that runs programs for a wide-variety of applications (spreadsheets, word processing, desktop publishing, drawing, etc.) which have a relatively consistent appearance and command structure. The windowing environment presents the user with specially delineated areas called windows on a display, each of which is dedicated to a particular application program, file or document. The windows can typically be re-sized, moved around on the display, and stacked so as to overlay other windows. Currently, the windowing environment allows windows to be increased to a full-screen display or minimized, meaning the window is reduced to and denoted by an icon.

The windows environment starts with a desktop window that displays icons representing programs, files and resources available to the user. As such, the desktop window acts as a launching point for running application programs, opening documents or files, and initiating operating system services. The desktop window cannot be minimized or closed. Instead, the desktop window always remains as a full-screen background display upon which other windows overlay.

One area that primarily uses a windowing environment is in Internet-based applications. The Internet is a worldwide collection of cooperating computer networks. A user typically accesses the Internet through a "client" computer. The client computer communicates with a "server" computer on a remote computer network using telephone, ISDN, or T1 lines or similar physical connections. The server computer may display or download content (e.g., images, text, application programs, etc.) to the client computer for viewing or execution by the user.

The client and server computers communicate through software protocols, such as File Transfer Protocol (FTP), Simple Mail Transfer Protocol (SMTP), Hypertext Transfer Protocol (HTTP), Gopher, etc. Currently HTTP is the most widely used protocol and is used for accessing the World Wide Web.

The World Wide Web consists of interconnected computer networks having computers, also referred to as "sites," which make multi-media documents in HTML format generally available for downloading or retrieval by individuals having a computer with Internet access. The documents are generally created in Hypertext Markup Language (HTML). Each HTML document supports embedded hyperlinks that reference other locations (folder, FTP site, other HTML documents, etc.) allowing the system (i.e., client computer) to jump to another location when the user selects a hyperlink by clicking on the hyperlink or pressing an appropriate keystroke.

Uniform Resource Locators (URL) are used in conjunction with hyperlinks to identify the location to which the system jumps. URLs typically define a protocol to be used, the domain name of a server computer, the port address to be used for communication, and the directory path to access a desired document. Thus, when a user selects a hyperlink, the system uses a URL to establish communication with a server computer designated in the URL and displays a document or content retrieved from the server.

HTML also allows graphical images to be embedded in HTML documents. When a graphical image is embedded in an HTML document, the dimensions or size of the embedded graphical image may be defined with HTML statements. For example, the size of an embedded graphical image may be defined in HTML by <IMG SRC="file.gif" WIDTH=X HEIGHT=Y>, where IMG is an HTML tag referencing an embedded image, SRC="file.gif" defines the location and name of the file containing the graphical image embedded in the HTML document, (e.g., a Graphics Information file or *.GIF) and X,Y are the respective width and height of the graphical image measured in pixels.

Software object components also may be used with the HTML document for displaying executable content, such as for animations or information processing. Currently, most Internet browsers support embedded software object components in the form of ActiveX controls, Java applets, and Visual Basic Scripts. These software object components are inserted into HTML documents using the <Insert> or <Object> HTML tags.

The above-described protocols and HTML documents are the underlying structure for most Internet-based applications. One such Internet-based application achieving widespread success is called Internet broadcasting. Internet broadcasting effectively turns a computer terminal into a high-tech television set, allowing a client computer to change "channels" for displaying news, sports scores, stock charts, weather updates and other kinds of information which are downloaded from the Internet. The information displayed for the channels is dynamically updated, such as through scheduled downloads.

One provider of an Internet broadcasting application is PointCast Inc., (http://www.pointcast.com). PointCast provides an Internet broadcast application on its Internet site so that a user can download the application to the user's computer. The Internet broadcast application executes as a windowed application in the windowing environment on the user's computer. In the application's window, the Pointcast application displays a channel viewer. The channel viewer contains different panes for filtering, organizing, and reading news. One pane lists a collection of channels encompassing such topics as companies, industries, life styles, news, and sports. When a user selects a channel, a second pane is displayed showing a list of current stories relating to the selected channel. If a user selects a story, the full text for that story is displayed on a third pane. The software allows a user to personalize the makeup of each channel. For example, a user can choose options to have only NBA scores posted under a sports channel, while excluding NHL and NFL scores. The PointCast software can also be used for displaying a screen saver which is triggered after a predetermined period of inactivity on the client computer.

The PointCast application has several drawbacks. For example, all of the content displayed on the client computer is delivered from a single server computer called the Internet broadcasting server (e.g., the PointCast server), rather than directly from the content providers. Thus, the information provided is only as up-to-date as the Internet broadcasting server. Additionally, if a user is interested in displaying content not available on the Internet broadcasting server, there is no means for integrating that content into the Internet broadcast. The content available from the Internet broadcasting server also lacks hyperlinks for jumping to other documents on other server computers. Furthermore, there is no means for scanning or navigating through content that has been selected.

The present invention provides Internet-broadcaster functionality integrated into a desktop window on a client computer. The desktop window is called an "active" desktop because rich multimedia documents are integrated therein and the documents are automatically updated and dynamically displayed. The documents are retrieved directly from the content providers so they are as up-to-date as possible. Additionally, the desktop provides documents containing hyperlinks so that a user has access to information on multiple server computers.

In one aspect of the invention, a client computer connects to a computer network, such as the Internet, and retrieves a "main" channel guide containing a list of content providers from which a user can select one or more content providers. Based on the user's selections, the client computer retrieves one or more documents associated with a content provider selected from the channel guide. The one or more documents are then integrated into the desktop window on the client computer.

In another aspect of the invention, the user may customize which documents are displayed from a selected content provider. In such a case, a user selects a content provider and a list of document preferences associated with the selected content provider are displayed. The user may then select the desired document preferences. Each document preference selected results in the display of one or more documents related to that preference.

In another aspect of the invention, the document retrieved contains hyperlinks, thereby allowing a user to select a hyperlink and jump to another document (e.g., folder, HTTP or FTP site, other HTML documents, etc.) associated with the hyperlink. The document may be an HTML document with hyperlinks embedded therein.

In yet another aspect of the invention, documents are provided from multiple servers, and the documents are sequentially displayed in the desktop window. Thus, a user is provided with the most up-to-date content from selected content providers. The system accomplishes this by storing URLs for the content providers selected from the channel guide in user-preference storage, such as in entries of a registry on the client computer.

In still a further aspect of the invention, content providers not listed in the channel guide are able to provide their own channel guide and display documents on the desktop of the client computer. Special controls (ActiveX Controls, Java applets, VB Scripts, etc.) are used by content providers not listed in the channel guide to display the documents. The control allows for storage of a URL corresponding to the content providers in the user-preference storage.

Thus, using the present invention, rich multimedia documents are integrated directly into the desktop window on a client computer. The documents are HTML and may include VB scripts, java applets and hyperlinkable content allowing the user to browse a computer network, such as the Internet or Intranet. Further, the present invention allows content providers listed and content providers not listed in the channel guide to display documents in the desktop window. Finally, the content displayed is the most up-to-date content, since it is provided directly from the content providers.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
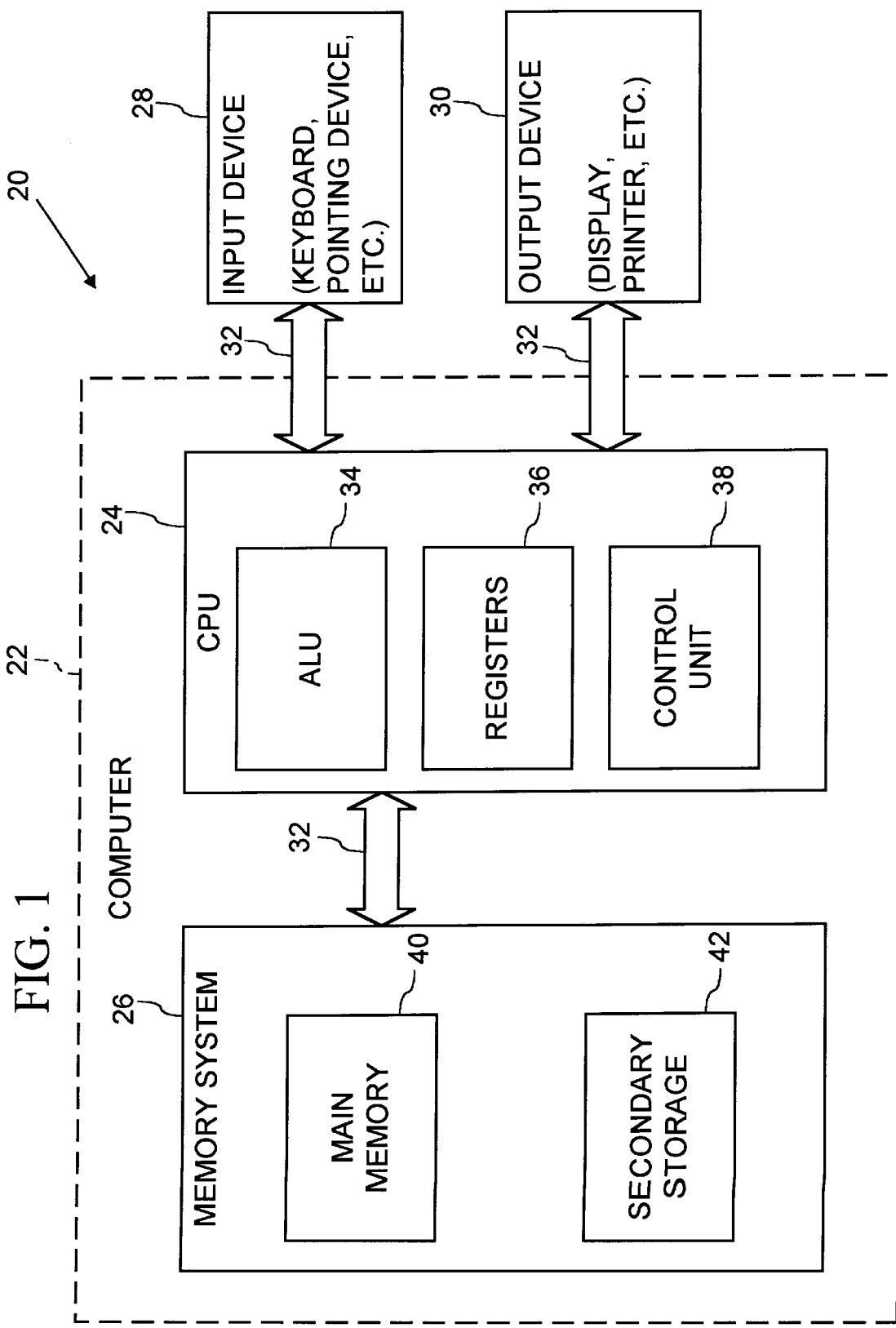
FIG. 1 is a block diagram of a computer system that may be used to implement a method and apparatus embodying the invention for displaying a desktop window having a document integrated therein.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
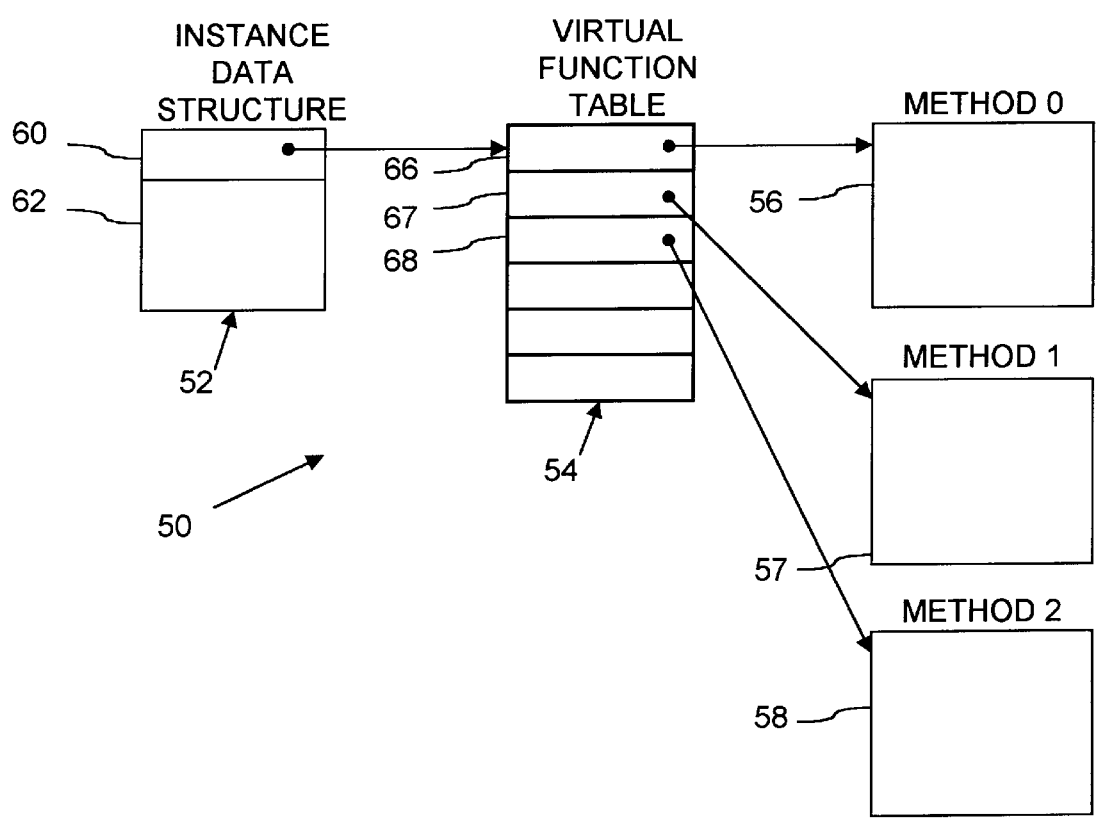
FIG. 2 is a block diagram illustrating objects conforming to a component object model used in the present invention.

Referring to FIG. 2, the illustrated embodiment of the invention utilizes objects which conform to the component object model (COM) of Microsoft Corporation's OLE. For a detailed discussion of OLE see *Inside OLE, Second Edition* by Kraig Brockschmidt, Microsoft Press, Redmond, Wash. 1995. A brief overview of objects in OLE and associated terminology is provided below before discussing the details of the illustrated embodiment.

An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

OLE's COM specification defines binary standards for objects and their interfaces which facilitate the integration of software components. According to the COM specification, a typical object 50 is represented in the computer system 20 (FIG. 1) by an instance data structure 52, a virtual function table 54, and member functions 56–58. The instance data structure 52 contains a pointer 60 to the virtual function table 54 and data 62 (also referred to as data members, or properties of the object). A pointer is a data value that holds the address of an item in memory. The virtual function table 54 contains entries 66–68 for the member functions 56–58. Each of the entries 66–68 contains a reference to the code 56–58 that implements the corresponding member function.

The pointer 60, the virtual function table 54, and the member functions 56–58 implement an interface of the object 50. Client programs interact with the object 50 by obtaining a pointer (referred to as an interface pointer) to the pointer 60 of the virtual function table 54. OLE includes a type definition of an interface pointer which allows client programs to call member functions on the interface by name through the interface pointer and provides type checking on the function's arguments, as expressed in the following code (in the C++ programming language):

pInterface→MemberFunction( . . . )

Interfaces conventionally are given names beginning with a capital "I". Objects can include multiple interfaces which are implemented with one or more virtual function tables. The member function of an interface is denoted as "IInterfaceName::FunctionName."

The object 50 conforming to the COM specification exhibits data encapsulation by exposing its interfaces (semantic groupings of its member functions) to client programs. The client programs interact with the object 50 by calling the member functions 56–58 on a particular interface of the object, but do not directly manipulate the object's data. The object 50 also exhibits polymorphism and inheritance in that the object 50 can provide interfaces in common with a base class and other similar objects, so that client programs can interact with each of the objects in the same manner by calling member functions of the interface that the objects have in common.

Figure 3:
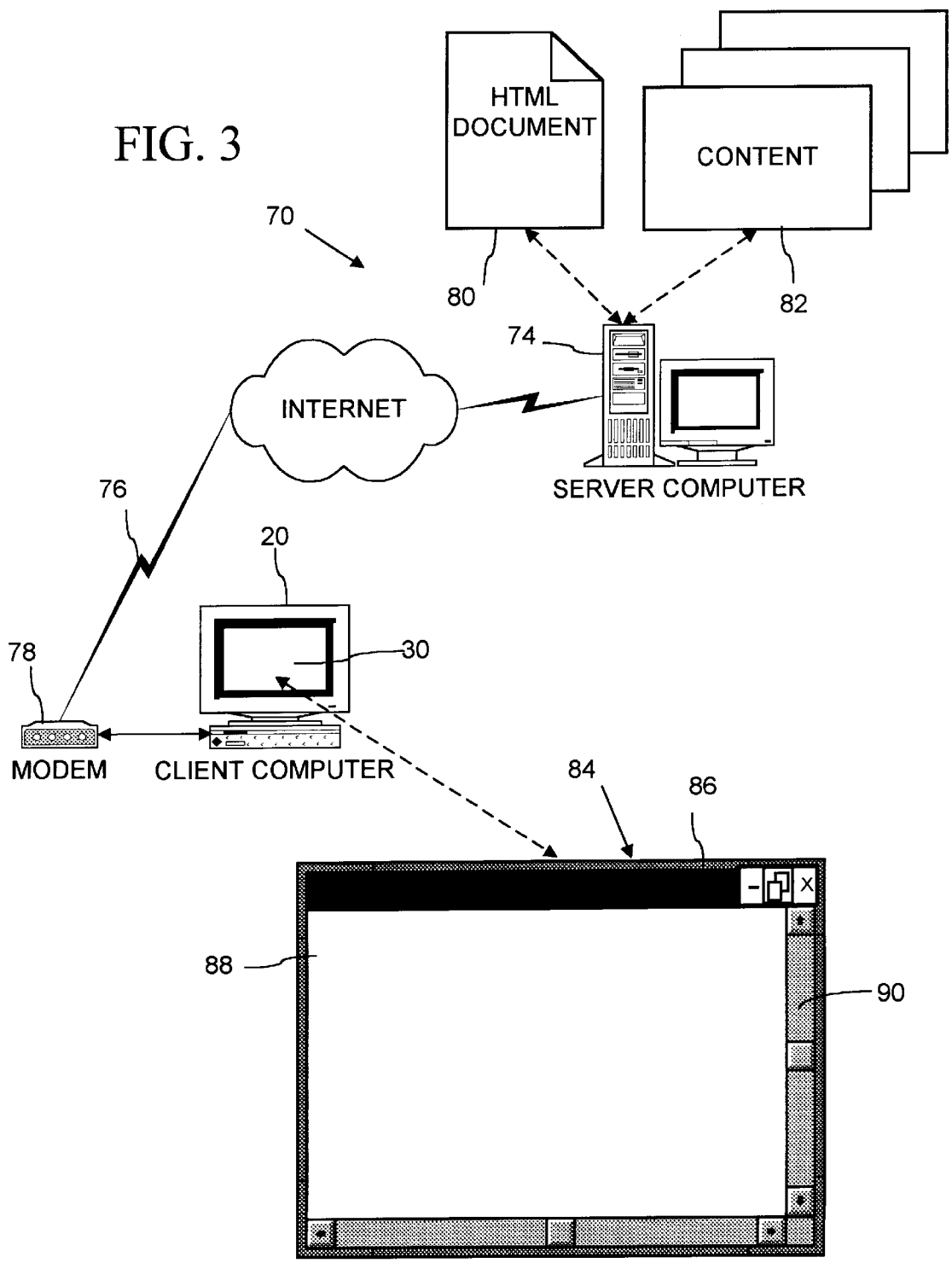
FIG. 3 is a known browser environment on a client computer for connecting to and interacting with an Internet server computer.

FIG. 3 shows a known browser environment 70 used to access information through the Internet. A client computer 20 uses a "browser" (e.g., Microsoft Corporation's Internet Explorer) to access documents and programs available on a remote computer called a server computer 74. The client computer 20 connects to the server computer over a telephone line 76 using a modem 78.

Typically documents residing at the server computer 74 are HTML documents, such as document 80, and may include extensions and enhancements of HTML standards. The document 80 is used to display content on the client computer, which may include text, images, audio, video, executable software components, etc. The content may be within the HTML document itself or incorporated therein by using HTML tags that specify the location of files 82 that contain content.

When used for browsing documents, the illustrated browser displays the document in a window 84 of the computer's display 30 allocated to the browser by the operating system. The illustrated window 84 comprises a frame 86, a document display area 88, and user interface controls 90. The browser displays the document within the document display area 88 of the window 84.

Figure 4:
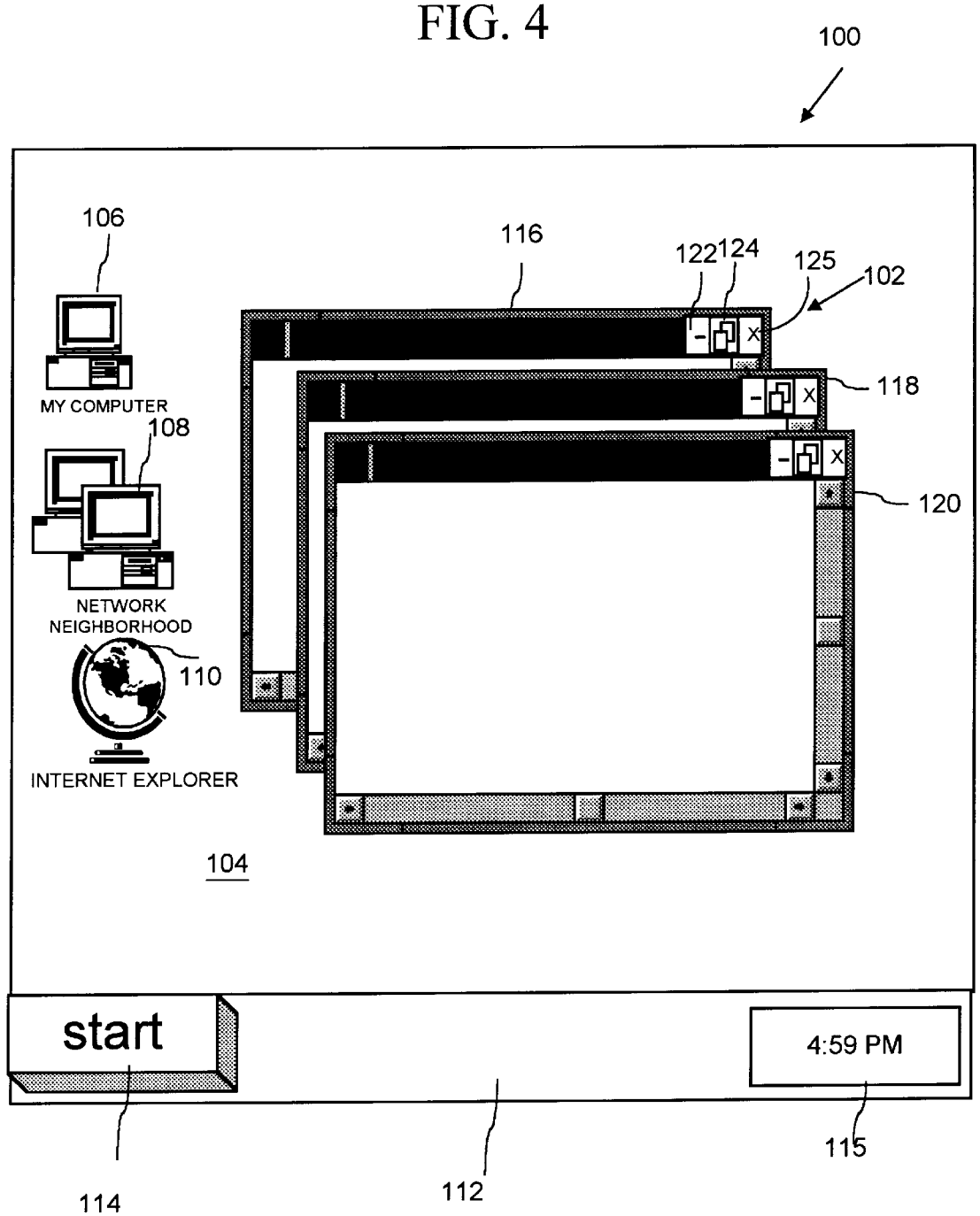
FIG. 4 is an illustration of a known windows user interface including a desktop window.

Referring to FIG. 4, a known windows graphical user interface environment 100 (that of the Microsoft Windows® 95 operating system) is shown. The graphical user interface is displayed on a computer display 30 (FIG. 3). The graphical user interface 100 includes a plurality of windows 102 overlapping in a front-to-back order. The back-most window is called a desktop window 104. The desktop window is a full-screen display containing icons representing programs, files and resources available to the user. As such, the desktop window acts as a launching point for running application programs, opening documents or files, and initiating operating system services. The illustrated desktop window includes desktop icons, such as a "My Computer" icon 106, a "Network Neighborhood" icon 108 and an "Internet Explorer" icon 110. Other desktop icons are typically displayed on the desktop 104, but are not shown for purposes of simplicity.

The desktop window 104 also includes a task bar 112 which extends the length of the desktop window at a bottom-most portion thereof. The task bar 112 includes a start button 114 and a clock 115. Upon clicking the start button 114, a menu (not shown) appears containing user selectable commands, such as for running programs, shutting down the computer, and displaying folders. The task bar displays icons or buttons representing currently running applications.

Elements on the desktop window 104, such as the desktop icons 106, 108 and 110 and the task bar 112, can be moved or re-sized, but cannot be minimized any further. To "minimize" an application means to remove all windows associated with that application from the display such that only an icon or other graphical element remains on the task bar representing the application. Minimized applications are still active, however, and may run in the background. The desktop window remains displayed when all other applications or programs are minimized or closed.

Three overlapping windows 116, 118 and 120 overlay the desktop window 104 in a front-to-back order. Each window represents a separate application, file or document. Window 120 is the front-most window, and, as such, is the window which accepts user input. The user can switch other windows to the front by clicking with a mouse or other pointer device, or by inputting certain key combinations. This allows the user to work with multiple application programs, files and documents. Windows 116, 118 and 120, each have minimize and maximize buttons, such as buttons 122, 124 (on window 116), and a close button, such as button 125, so that the window can be reduced to a button in the task bar or expanded to full-screen, filling the desktop window 104.

Figure 5:
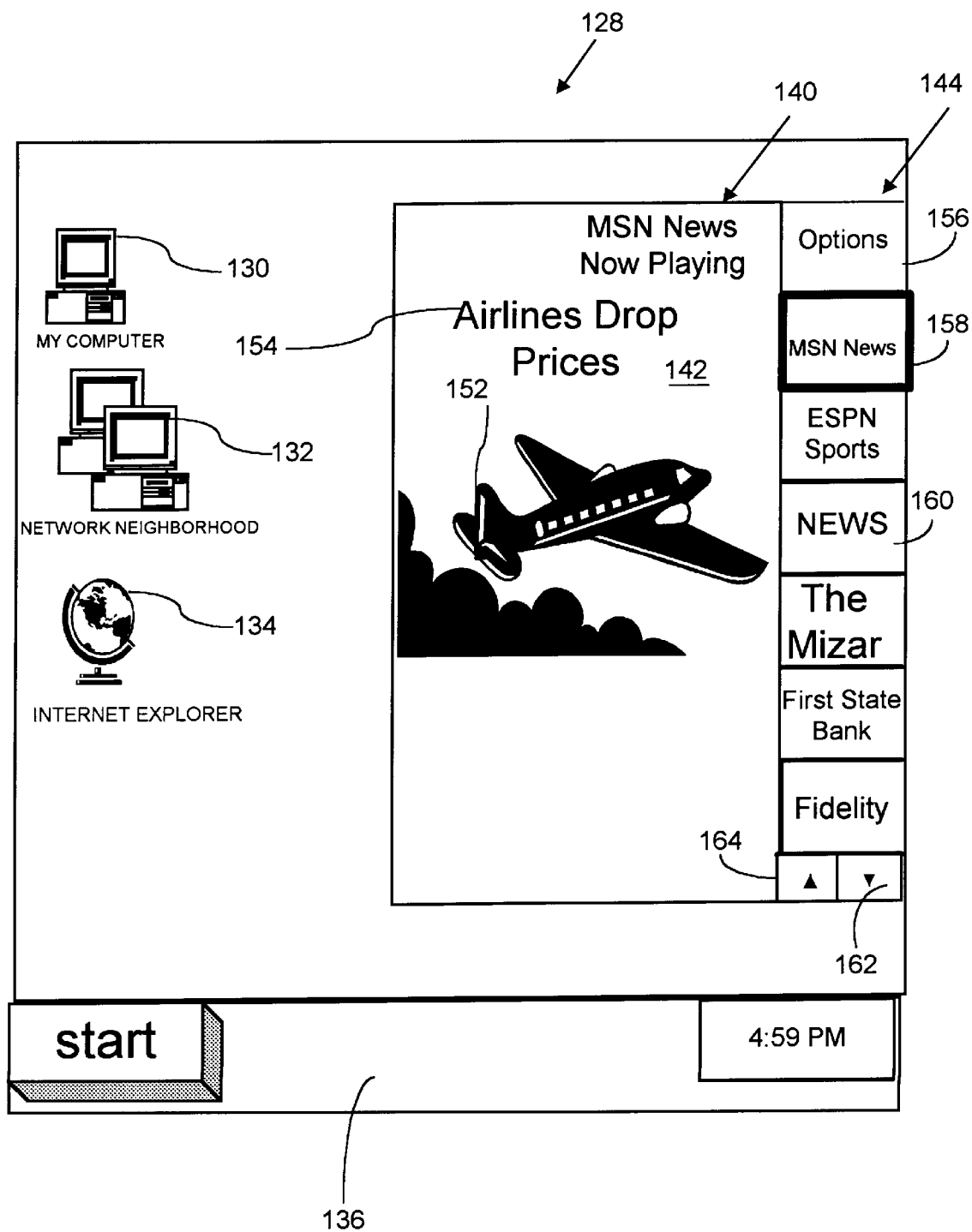
FIG. 5 is an illustration of a desktop window according to one aspect of the invention with a desktop viewer for displaying a document on a first pane of the desktop window and desktop icons being displayed on a second pane of the desktop window.

FIG. 5 shows an active desktop window 128 according to the present invention. The windowing environment shown is that of a Windows 95 or Windows NT operating system, but the invention is equally applicable to other windowing environments. The window contains desktop icons 130, 132 and 134, and a task bar 136 similar to those described in FIG. 4. Additionally, the desktop window 128 includes a viewer 140 and a channel bar 144. The viewer 140 and channel bar 144 are integrated into the desktop window meaning they are in the same window as the desktop window. Thus, the document is displayed on the desktop window without opening a separate window.

The desktop window 128 of FIG. 5 integrates rich multimedia content into a standard desktop window of a windowing environment. In so doing, the desktop window provides all the functionality of a standard desktop window, and displays documents provided from a computer network. Documents related to sports, entertainment, business, news and other topics of information can thereby be displayed and integrated into the desktop window 128. The documents are updated and sequenced through automatically so that the desktop is dynamically displaying up-to-date information to the user.

The viewer 140 is a hypertext document viewer used to display hypertext documents provided from the Internet, such as HTML pages. The invention may alternatively be embodied for displaying documents from public or private computer networks, such as a computer network of a commercial on-line service or an internal corporate local area network (LAN), an Intranet or like computer network. The illustrated document 142 (referred to as a "teaser") includes a graphical image 152 of an airplane and a text headline 154 indicating that airline ticket prices have been reduced. The teaser provides only a portion of information available from a content provider and is designed to entice a user to click on the teaser so that more information relating to the teaser is displayed. The viewer 140 sequences through different teasers, displaying one at a time for a predetermined period of time and then displaying the next teaser in the sequence. As will be further described below, a user can customize the teasers displayed in the viewer.

The channel bar 144 lists the currently selected channels. The currently selected channels are denoted by channel buttons, such as buttons 156, 158, and 160. Each channel button represents a different channel corresponding to a topic of information or a different content provider. For example, channel button 160 is a news channel (a topic), which may include many content providers, whereas channel button 158 is a specific content provider. Other channels may be displayed for different topics or providers of information. For example, channels relating to business, weather, stock information, and customized channels provided by a corporate administrator may be displayed. The channel buttons may be text only as illustrated, or may include graphics.

A user can customize the channels that are displayed on the desktop window, so that only channels of interest are shown. Channels in the channel bar are automatically displayed one after another in a sequential order. When a current channel is displayed, one or more documents relating to that channel are sequentially displayed. Currently, MSN News channel is displayed as indicated by the dark outline of the MSN News channel button 158 and the text located at the top of the viewer stating "MSN News now playing." The document 142 is content provided from MSN News. The next document may also be displayed from MSN and so on until all documents from MSN are displayed. The desktop 128 then switches to the next channel, which is ESPN Sports. In the case where the channel is a general topic (e.g., channel button 160), one or more content providers display documents sequentially.

Up and down buttons 162 and 164 allow a user to scroll through the list of currently selected channels.

The options button 156 located at the top of the channel bar always remains displayed and does not scroll when using up and down buttons 162 and 164. Selecting the options button results in the opening of an options window having a menu of options the user can select. For example, the user can select an option (not shown) for removing the channel bar 144 and viewer 140 from the desktop, thereby converting the desktop to that shown in FIG. 4. Additionally, the user can select the duration that each document or channel is displayed. The user can also access a channel guide (sometimes referred to as a catalog) that allows the user to select channels and documents displayed in the viewer 140, as will be further described below. In other words, a user can add to or delete, from the list of currently selected channels in the channel bar, a content provider or topic of information.

The options menu also provides a navigation controls option (not shown) which includes fast-forward, play, pause and reverse options. The navigation controls allow a user to control the viewer 140 in the same way a user playing a VCR tape or compact disk can play, fast forward or rewind a tape or CD. Thus, a user can play, fast forward, pause, or rewind through the sequentially displayed documents and channels on the viewer 140. Using one or more of the controls is referred to as "scanning" through the documents.

Figure 17:
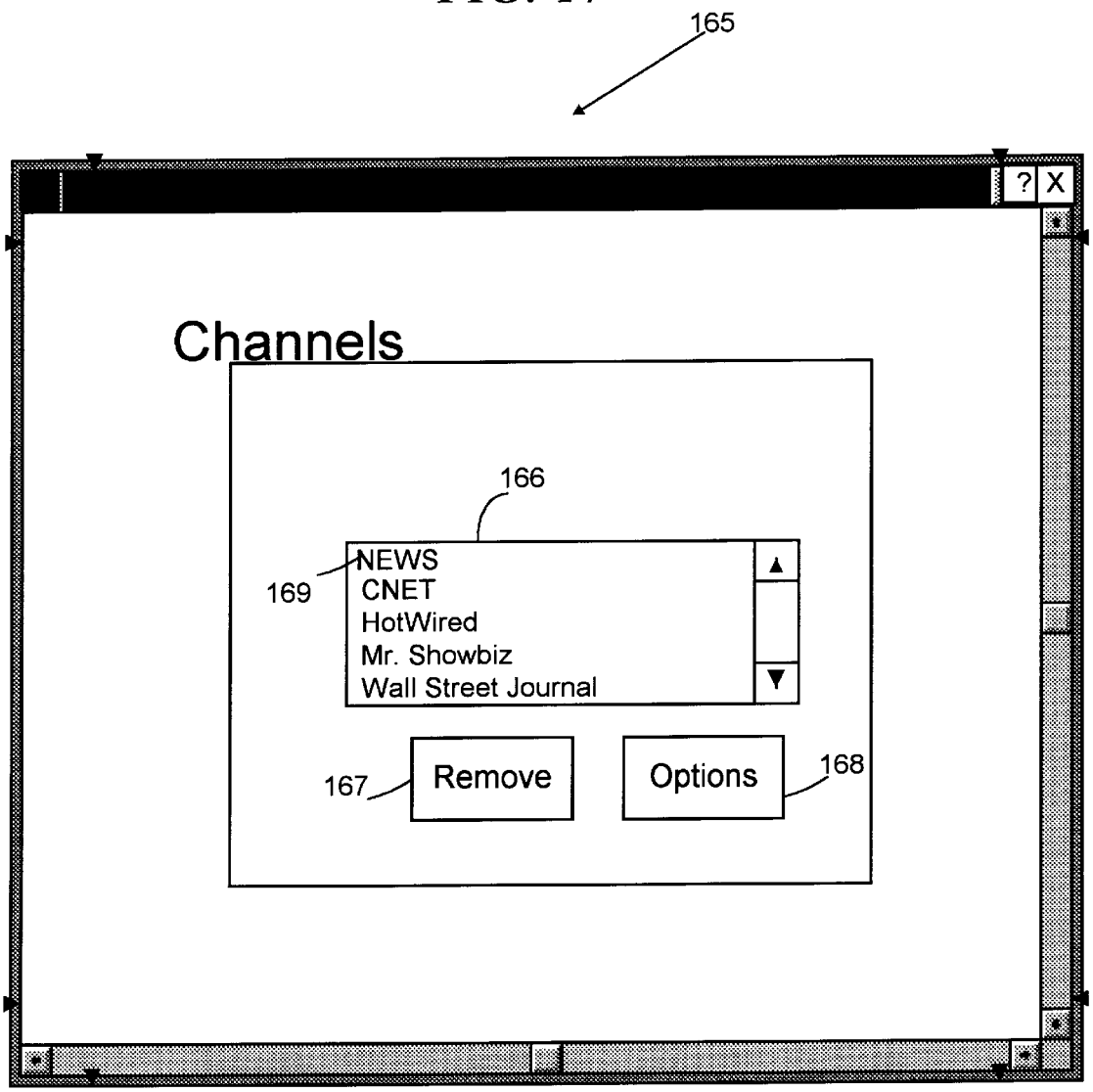
FIG. 17 is an illustration of a channel guide listing multiple channels. Selecting a News channel displays the window shown in FIG. 7.

The channel guide allows a user to customize which documents are displayed in the viewer 140. The channel guide, which is shown in FIG. 17 and will be described in more detail below, provides a list of content providers and topics relating to a desired channel and allows a user to choose content providers displayed in the channel bar 144. Only content providers associated with buttons in the channel bar display documents in the viewer 140. Once content providers are chosen, the viewer may display default selections of documents associated with the chosen content providers. Alternatively, the channel guide also allows further customization by the user by allowing selection of specific document preferences offered from the content providers.

Figure 6:
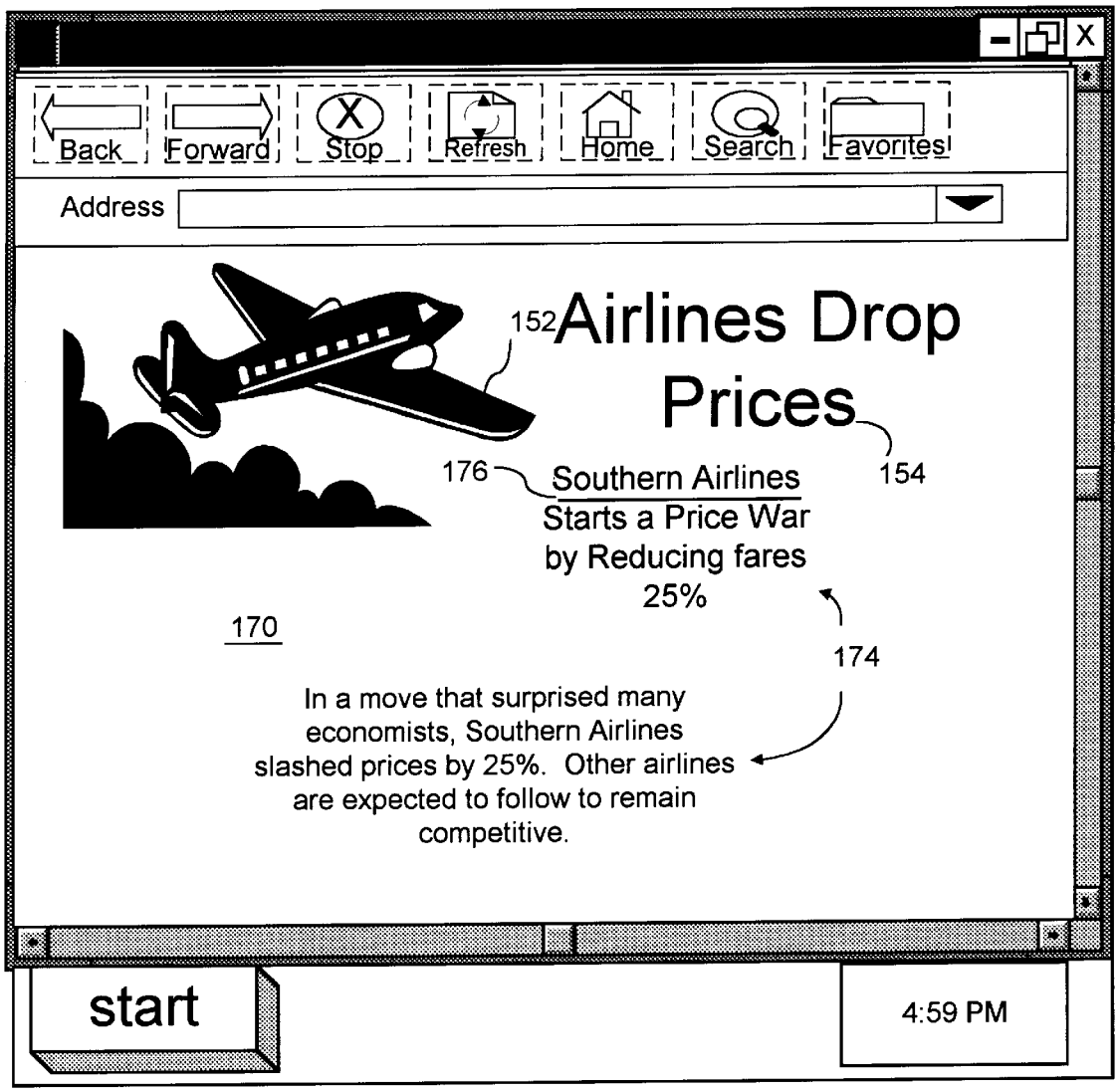
FIG. 6 is an illustration of a browser for displaying additional information about the document displayed in the desktop viewer of FIG. 5.

FIG. 6 shows a browser 170 (in this case, an Internet Explorer 4.0 browser) that is displayed if the user directly clicks on the teaser displayed in the viewer 140. The teaser image 152 and text 154, which are displayed in the viewer 140 of FIG. 5, may be also displayed in the browser 170. Of course, the teaser image and text need not be incorporated into the browser. Additional content 174 is also displayed to provide further information about the teaser 142.

The browser is a standard browser for displaying content, including hyperlinks. For example, a hyperlink 176 is shown as the underlined text "Southern Airlines." Thus, selecting hyperlink 176 allows a user to browse the Internet and display documents related to Southern Airlines, such as a Southern Airlines home page.

A channel guide window is displayed when a user selects the channel guide option (not shown) from the options window (displayed when option button 56 (FIG. 5) is selected). The channel guide is organized so that users may search on content providers or topics of information.

The channel guide can be organized as a hierarchy of topics, such as news, sports and entertainment, with content providers listed under each topic. Alternatively, the channel guide can have no hierarchy. Instead, the channel guide can be a straight list of content providers. The channel guide can also be a combination of topics and content providers.

FIG. 17 shows an example of a channel guide displayed in window 165. The window 165 is displayed when the channel guide is selected from the options menu (associated with options button 156). A list of content providers and topics of information are shown in panel 166. The user may add or remove content providers or topics of information from the list of currently selected channels by selecting the appropriate topic or content provider in panel 166 and using buttons 167, 168. An illustrated topic is a News topic 169. If the user selects the News topic, the window shown in FIG. 7 is displayed.

Figure 7:
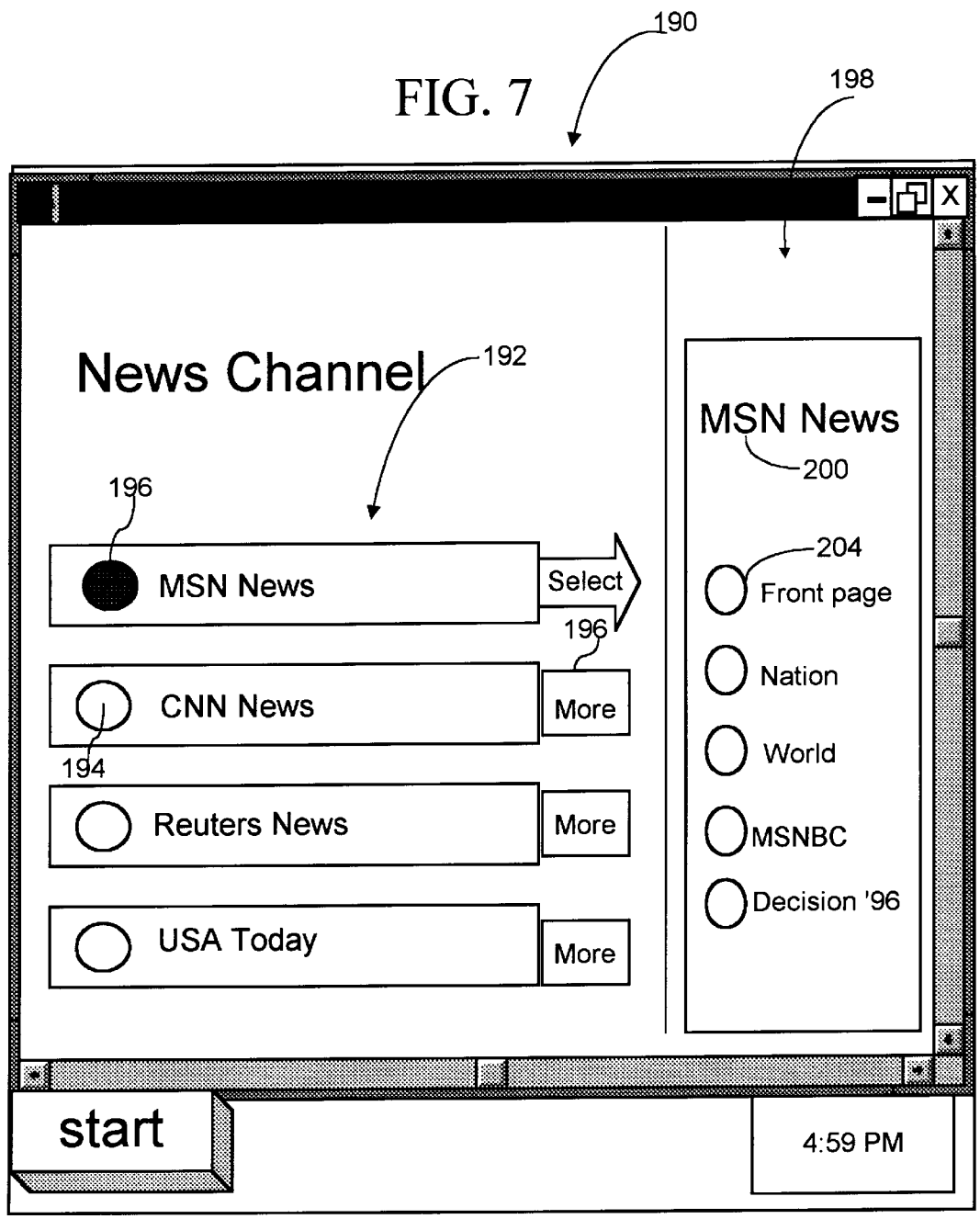
FIG. 7 is an illustration of a window in a channel guide according to the invention for customizing which documents are displayed in the desktop viewer of FIG. 5.

FIG. 7 shows an example of a window 190 (which is also part of the channel guide) displayed when a news channel topic is selected in window 165 of the channel guide. The window includes a list 192 of content providers that provide documents related to the selected channel.

Adjacent each content provider is a check box shown as an oval, such as check box 194. If a user wishes to select a content provider so that documents from that content provider are displayed in the viewer 140 (FIG. 5), then the user selects the check box adjacent the desired content provider by clicking on the check box or otherwise using a pre-assigned key stroke (e.g., space bar and/or arrow keys). For example, in the window 190, MSN news is selected, as indicated by the darkened check box 196. The channel guide may provide for a default document to be presented in the viewer upon selection of a content provider.

In the illustrated channel guide, however, the user can also customize which documents are provided by the selected content provider. Buttons, such as button 196, adjacent each content provider listed allow a user to choose additional options for controlling the documents retrieved from a content provider. For example, selecting the buttons 196 changes a document pane 198 of the window 190 for displaying document preferences available to the user. The document pane 198 contains a heading 200 corresponding to the content provider selected and a list of document preferences available from the selected content provider. Check boxes, such as check box 204, adjacent each document preference allow a user to customize which documents are displayed from a particular content provider in the viewer 140. If the user selects check box 204, then one or more documents associated with the front page of MSN news are displayed.

The window 190 is preferably an HTML page. A URL (not shown) is associated with each content provider in the list 192 and each document preference in the document pane. When the user selects a desired content provider or document preference, the URL is stored, as further described below, allowing the client computer to obtain the desired document from a computer network. The user may simply close or minimize the windows 190 and 165 of the channel guide window to return to the desktop shown in FIG. 5.

Figure 8:
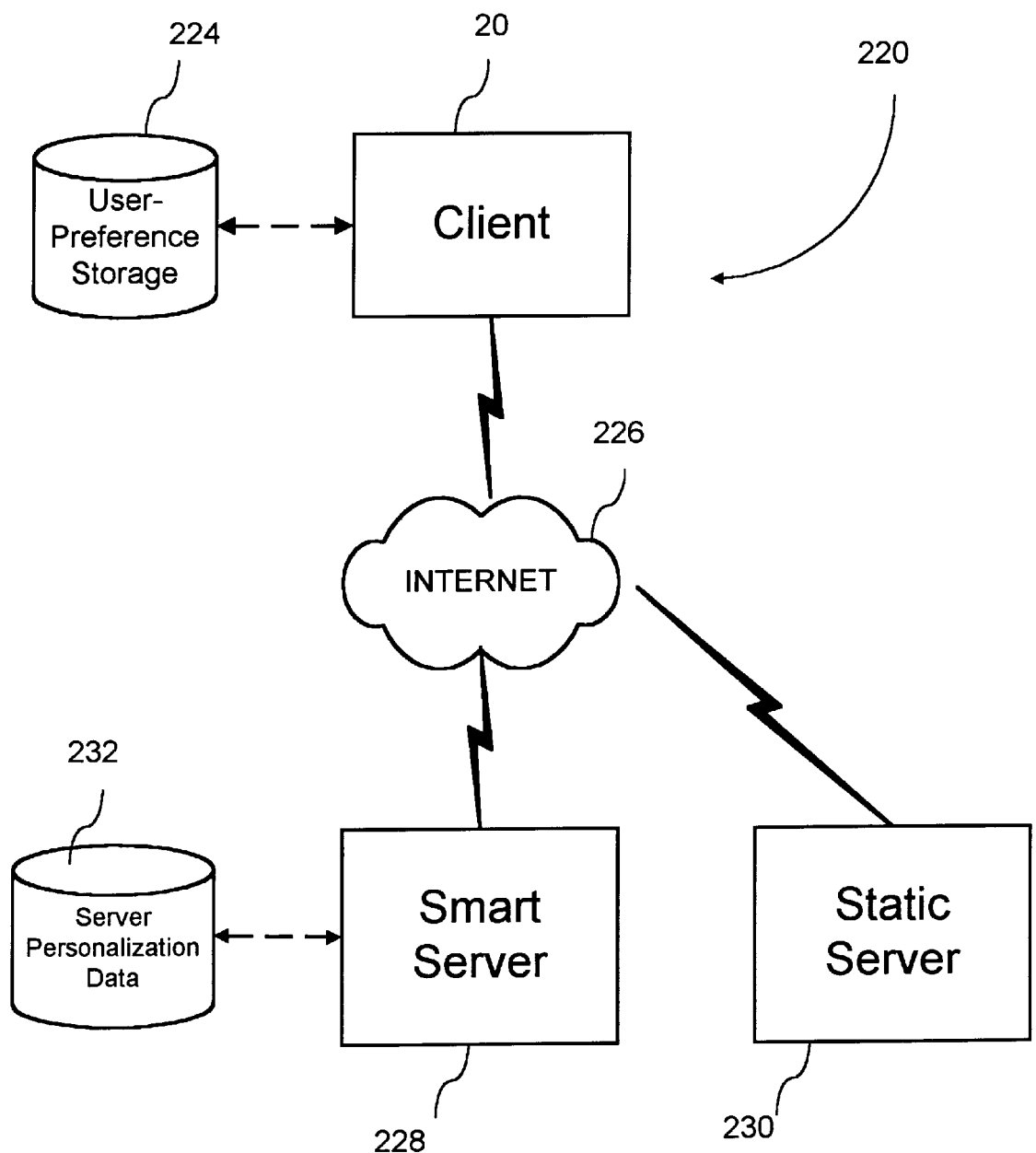
FIG. 8 is a block diagram showing a system architecture for displaying the desktop window of FIG. 5 on the client computer.

FIG. 8 shows the overall architecture of a system 220 used to display the active desktop on the client computer. The system 220 includes a client computer 20 for displaying the active desktop window 128 (FIG. 5). The client computer 20 includes a user-preference storage 224 which is used to store selections a user made from the channel guide. More specifically, the user-preference storage 224 stores the URLs associated with content providers and document preferences that the user selected from the channel guide. The URLs stored in the user-preference storage allows the client computer to retrieve the desired documents from the content providers. Additionally, when a user reenters the channel guide after previously making selections, the system uses the user-preference storage for re-displaying the channel guide, including selections the user previously made.

The user-preference storage 224 is preferably part of a registry located on the client computer. The registry is a database first introduced in Microsoft Corporation's Win32 application program interface (API) and contains information that supports shell applications (such as Windows File Manager) and applications that use Microsoft Corporation's linking and embedding (OLE) technologies. Each piece of information in the registry is identified by a key (not shown) which may have a value (data) associated with it. The registry is not meant as a place for applications to store private configuration information.

The Windows® operating system includes a set of functions (not shown) to support querying and setting information in the registry. The registry also provides a source for configuration information and enumerates and tracks applications, device drivers, and operating system control parameters. For a detailed discussion of the registry, see *Win32 Programmers Reference, Vol.* 2, published by Microsoft Press, Redmond, Wash. (1993). Other storage locations on the client computer 20 can be used as the user-preference storage 224, such as main memory 40 or secondary storage 42 (FIG. 1). In these locations, the user-preference storage may be in the form of a text file.

The client computer 20 is connected via an Internet connection 226 to servers, such as servers 228 and 230. Server 228 is designated as a smart server. Smart servers are servers that store personalization data for client computers that access that server. For example, any selections a user made in the channel guide are stored in storage 232 coupled to the server. Thus, when a user reenters the channel guide window after previously making selections, the system uses the storage 232 for re-displaying the channel guide window in the state the user left it.

Static servers, on the other hand, such as static server 230, do not store personalization data for the client computer. Instead, the static server retrieves personalization data from the client computer, which is stored in the user-preference storage 224. The user-preference storage 224 is typically not directly accessible from the static server. Therefore, the client computer stores the necessary information in a cookie, which the static server can retrieve once an Internet connection is established. Cookies are well-known in the art as being a feature of the HTTP protocol. Cookies are local storage maintained by the client computer which a server may request to put the server in the same state as the last time the user accessed the server.

The system 220 may use smart or static servers to present channel guide information to a user. In either case, the server is a default server that provides the channel guide to the user upon selecting the channel guide button 150. The user accesses the server by selecting the channel guide button 150 or 184 in either the desktop window or the news window. The user may also access the server using a browser.

Figure 9:
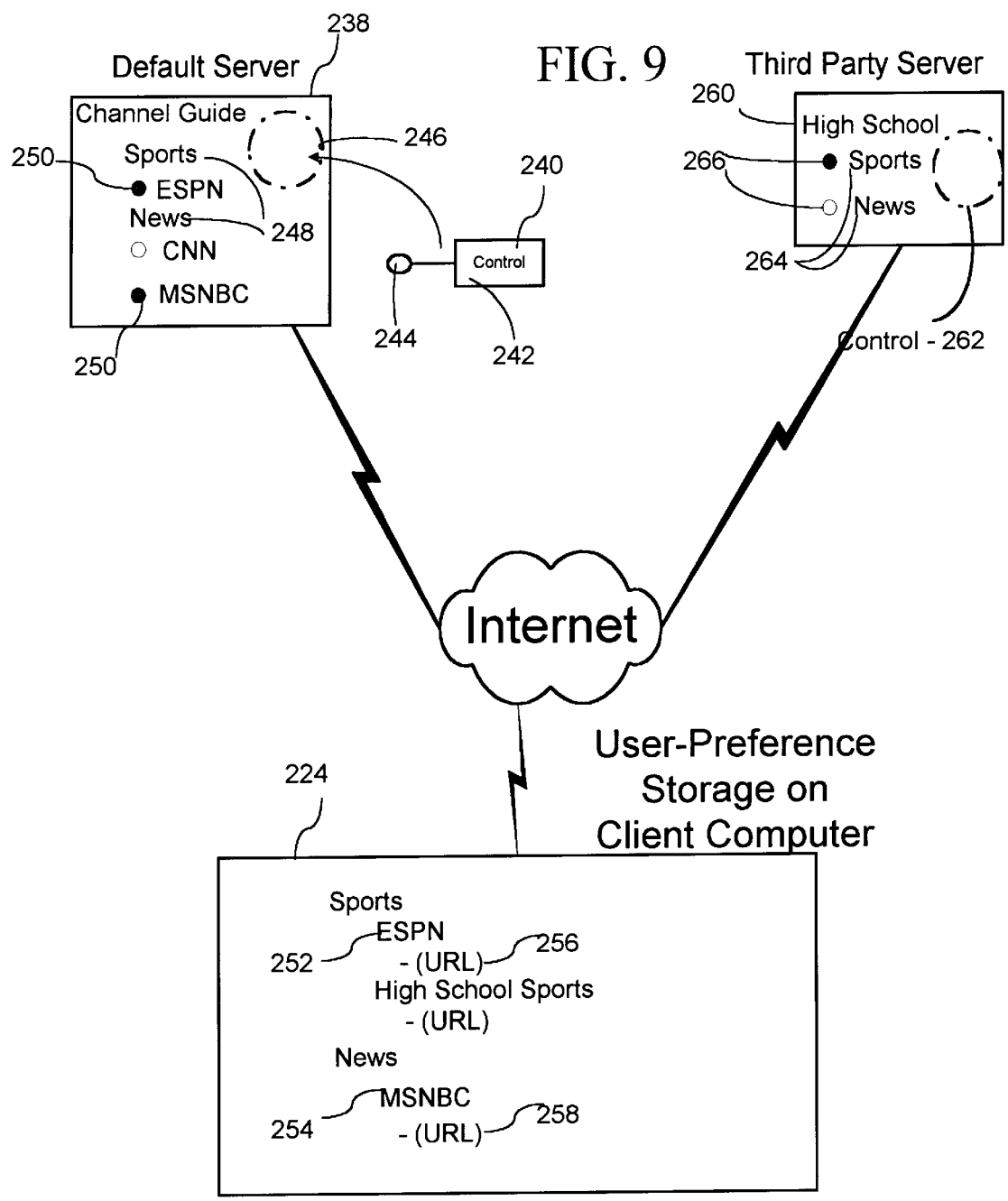
FIG. 9 is an illustration of using multiple channel guides from multiple servers to display documents in the desktop viewer of FIG. 5.

FIG. 9 provides further detail of how a channel guide 238 stores information in the user-preference storage 224. The channel guide 238 is preferably an HTML document hosting a control 240. The control is an object having an interface with functions for allowing the system to access (write and read) the user-preference storage 224. By convention, the control is designated by an object 242 having an interface 244, but hereinafter, controls are designated by a dashed circle embedded within a document, such as circle 246. The illustrated control is an ActiveX control, and may alternatively be one of many available controls, such as Java Applets, a Visual Basic scripts, or like objects. The control is embedded in the HTML channel guide by using special tags (e.g., Insert or Object tags).

The illustrated control supports an interface that provides one or more of the following functions:

AddProvider

The AddProvider function adds the selected content provider to the user-preference storage when the user selects a content provider from the channel guide. A URL is stored in the channel guide for each content provider and allows the client computer to connect to a server computer associated with the content provider.

DeleteProvider

The DeleteProvider function removes a selected content provider and a URL associated with the content provider from the user-preference storage when the user deselects a content provider listed in the channel guide.

SetProviderInfo

The SetProviderInfo function is used to allow a user to customize which documents available from a content provider are displayed on the active desktop. When a user selects a desired content provider, the system may display documents available from that content provider. A directory name associated with each document is stored in the user-preference storage on the client computer and references a document the user selected. The directory name is appended to the URL stored by the AddProvider function to point to a desired document on a server computer.

GetProviderInfo

The GetProviderInfo function reads the user-preference storage to obtain which documents the user selected. This function is used by the desktop viewer to obtain URLs stored by the AddProvider and SetProvider functions from the user-preference storage for displaying documents in the viewer. It can also be used to personalize a channel guide so that previously made user selections are redisplayed when the user reenters the channel guide.

The AddProvider, DeleteProvider, SetProviderInfo and GetProviderInfo can also be functions within objects with a public interface allowing other controls to use the objects.

FIG. 9 shows a channel guide 238 from a default server. Channel guide 238 is the main channel guide because it is the channel guide displayed when the user selects the channel guide from the options menu. In the example of FIG. 9, the channel guide 238 has three different content providers listed under two separate channels 248. More specifically, an ESPN content provider is listed under a sports channel, while CNN and MSNBC content providers are listed under a news channel. Check boxes 250 are darkened, indicating that a user selected ESPN and MSNBC, while the undarkened check box adjacent CNN indicates that user does not desire documents from the CNN content provider. A URL (not shown) is associated with each content provider in the channel guide and is embedded within the HTML channel guide document 238. For example, a URL is embedded within the channel guide pointing to an ESPN server.

In the case of FIG. 9, the ESPN and MSNBC content providers are selected and added to the user-preference storage by the AddProvider routine of control 240 as indicated at 252, 254. URLs 256, 258 are also stored in the user-preference storage and point to a predetermined document to be displayed on the active desktop. URLs 256, 258 are obtained from the channel guide and are a virtual addresses used to obtain documents from the content providers. Additional information (such as a directory) may also be stored in the user-preference storage so that the news window HTML page knows what document to display when the user clicks on a teaser. Thus, using the channel guide, a user can customize content providers that are displayed on the active desktop. As will be further described below, the user may also customize which documents are provided from a selected content provider.

FIG. 9 also shows that a channel guide 260 provided by a third-party server (or non-default server) can also be used to display documents on the viewer 140. The third-party server hosts a control 262 having the AddProvider and DeleteProvider functions, as already described. The channel guide 260 shows different channels 264 and check boxes 266 SO that a user can customize information displayed on the active desktop. Although not shown in FIG. 9, the channel guide 260 may also provide content providers listed under the selectable channels, and specific documents available from those content providers.

Thus, using the controls 240 and 262, channel guide selections from multiple servers can be combined in the user-preference storage and used to select desired content providers and documents to be displayed on the active desktop. As shown, the user-preference storage contains a list or schedule of content providers whose documents are displayed in the active desktop. As will be further described below, the active desktop reads the user-preference storage and displays a first document associated with a first content provider for a predetermined period of time, and then replaces the first document with a second document retrieved from a content provider listed next in the schedule. After a document associated with each content provider in the user-preference storage is displayed, the schedule displays the first document again and continues through the list to display an endless and seamless sequence of documents from desired content providers. For example, according to the user-preference storage 224, first a document from an ESPN server is displayed, then a second document from a content provider not listed in the channel guide is displayed (i.e., high school sports), and finally a document from a MSNBC server is displayed. This sequence is then repeated over and over.

The active desktop may also display multiple documents from a single content provider. Thus, a first document from the first content provider is displayed for a predetermined period of time and then a second document from the same content provider is displayed. Each document from that content provider may be displayed until proceeding onto the next content provider.

In the case where the channel guide is not organized in a hierarchy of topics, the user-preference storage stores a list of content providers without the headings, such as news and sports.

Figure 10:
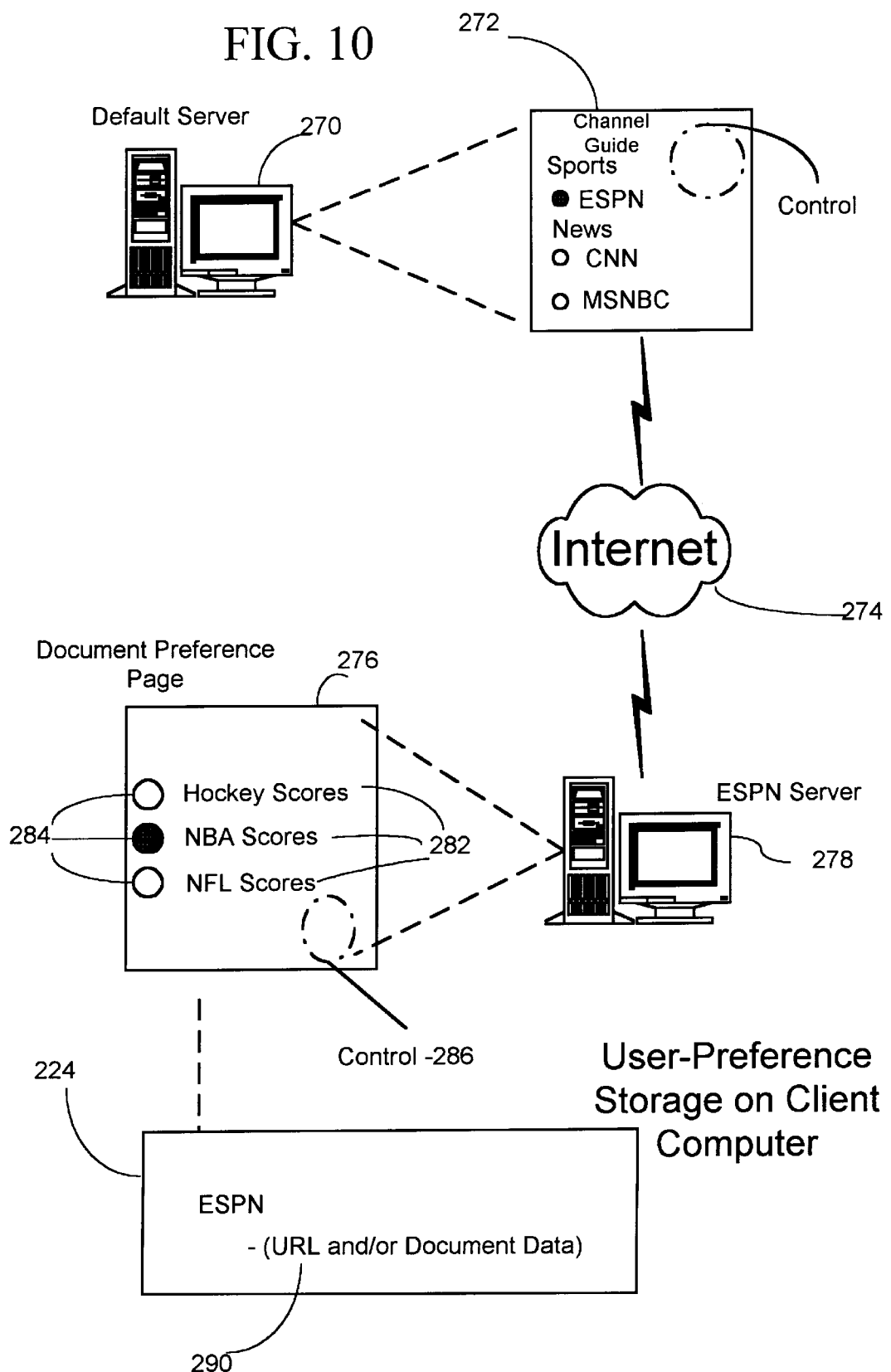
FIG. 10 is an illustration of using multiple servers for allowing a user to customize which documents from a content provider are displayed in the desktop viewer of FIG. 5.

FIG. 10 shows how documents provided by a selected content provider can also be customized by a user. A default server 270 displays a channel guide 272 in a manner similar to that of FIG. 9. In this case, however, selecting a content provider activates a hyperlink causing a jump or transition to the document preference pane 276 provided from a content provider server 278 listed on the Internet 274. The hyperlink is accomplished by storing a URL (not shown) associated with the content provider server 278 in the channel guide 272. The document preference page 276 is an HTML page displaying a list of document preferences 282 with check boxes 284 adjacent each document preference in the list. Selecting a document preference results in the display of one or more documents associated with that preference.

The document preference page 276 also includes a control 286 with a SetProviderInfo function and a GetProviderInfo function. The SetProviderInfo function stores personalization data in the user-preference storage on the client computer and indicates which document the user selected. The GetProviderInfo function allows the content provider server 278 to read the client user-preference storage to determine which documents the user selected the last time the user accessed the document preference page.

As shown in FIG. 10, the user selected ESPN. This caused the system to call AddProviderInfo adding the ESPN URL to the user-preference storage 224. Selecting ESPN also caused the system to jump to the ESPN server for displaying the document preference page 276 on the client computer. The user selected NBA scores causing AddProviderInfo to update the user-preference storage as indicated at 290. The document data may be a particular directory where NBA scores are located and is appended to the ESPN URL to point to the desired document. Thus, the illustrated channel guide is a hierarchical graphical menu system having different levels, such as the channel guide page 272 and the document preference page 276, for allowing the user to select documents to be displayed in the viewer 140.

Figure 11:
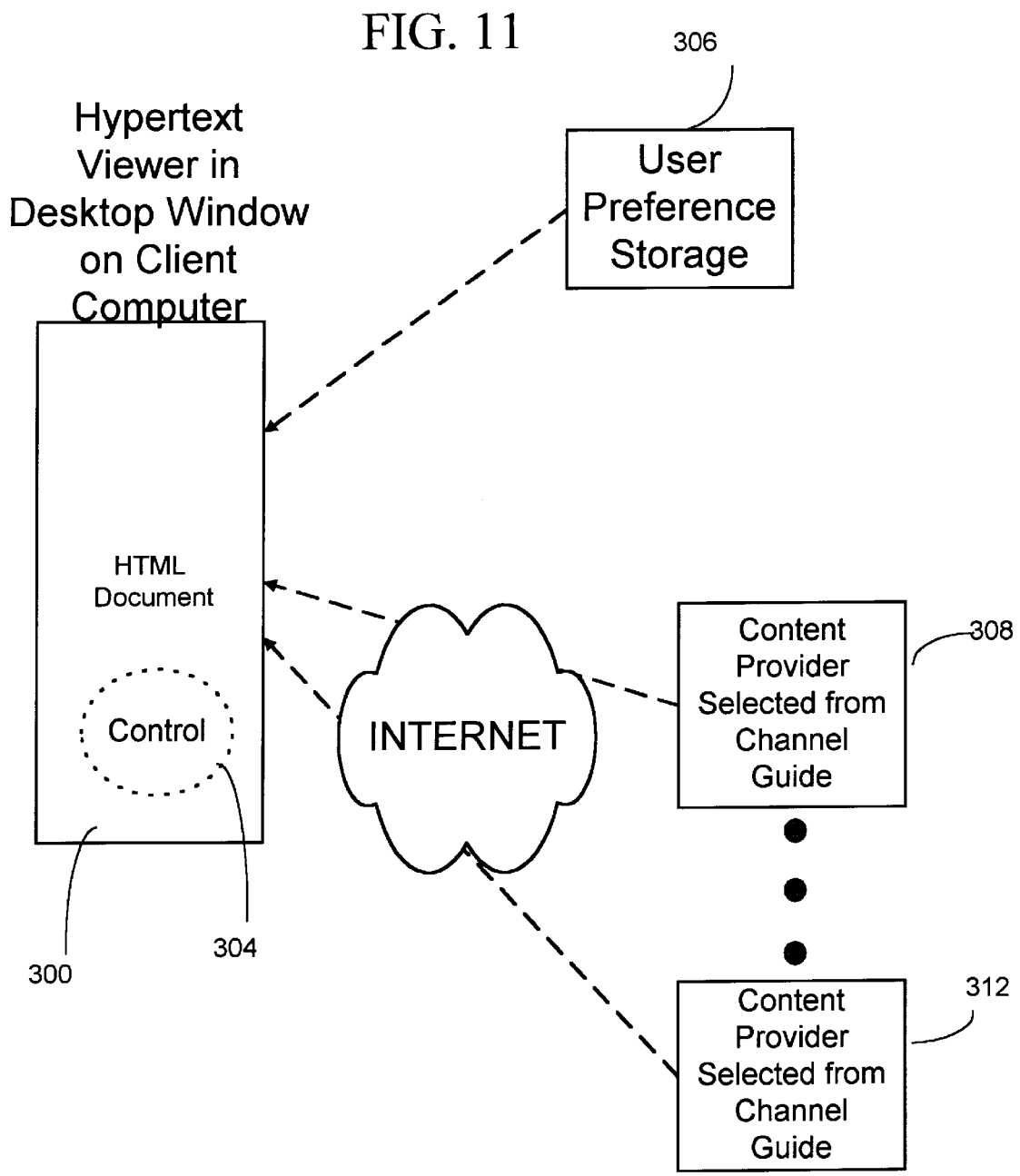
FIG. 11 is an illustration of the desktop viewer sequencing through documents provided by multiple content providers.

The format of entries in the user-preference storage has been simplified for purposes of illustration. An example format for the entries may be as follows:

FIG. 11 shows a viewer 300 similar to the viewer 140 shown in FIG. 5. The viewer 300 displays an HTML document that includes an embedded control 304 having the GetProviderInfo function for reading the user-preference storage 306 on the client computer. The HTML document provides the control 304 so that the viewer 300 can obtain the sequence of URLs from the user-preference storage.

The viewer 300 sequences through each content provider on the currently selected channel, displaying selected documents one at a time. For example, a content provider 308 is the first content provider listed in the user-preference storage 306 on the selected channel. Thus, the viewer uses a URL received from the user-preference storage to connect to the content provider 308 via the Internet. Content from the content provider 308 is displayed in the viewer 300. At predetermined intervals, the HTML document switches the display to sequence through one or more documents from each content provider on the selected channel. After sequencing through all the content providers, the HTML document repeats the process starting again with the first content provider 308.

The default server 270 (FIG. 10) is not needed once the channel guide is established. Instead, the active desktop retrieves the documents from the Internet using the URLs listed in the user-preference storage. If the user wishes to change the customization options, the client computer connects to the default server by selecting the channel guide in the options menu.

As explained, the HTML document follows a schedule dictated by the order of the entries in the registry. Alternatively, a scheduler may be used to create the order in which documents are displayed.

The HTML document 300 may alternatively be implemented in the form of a dynamic link library (DLL).

Figure 12:
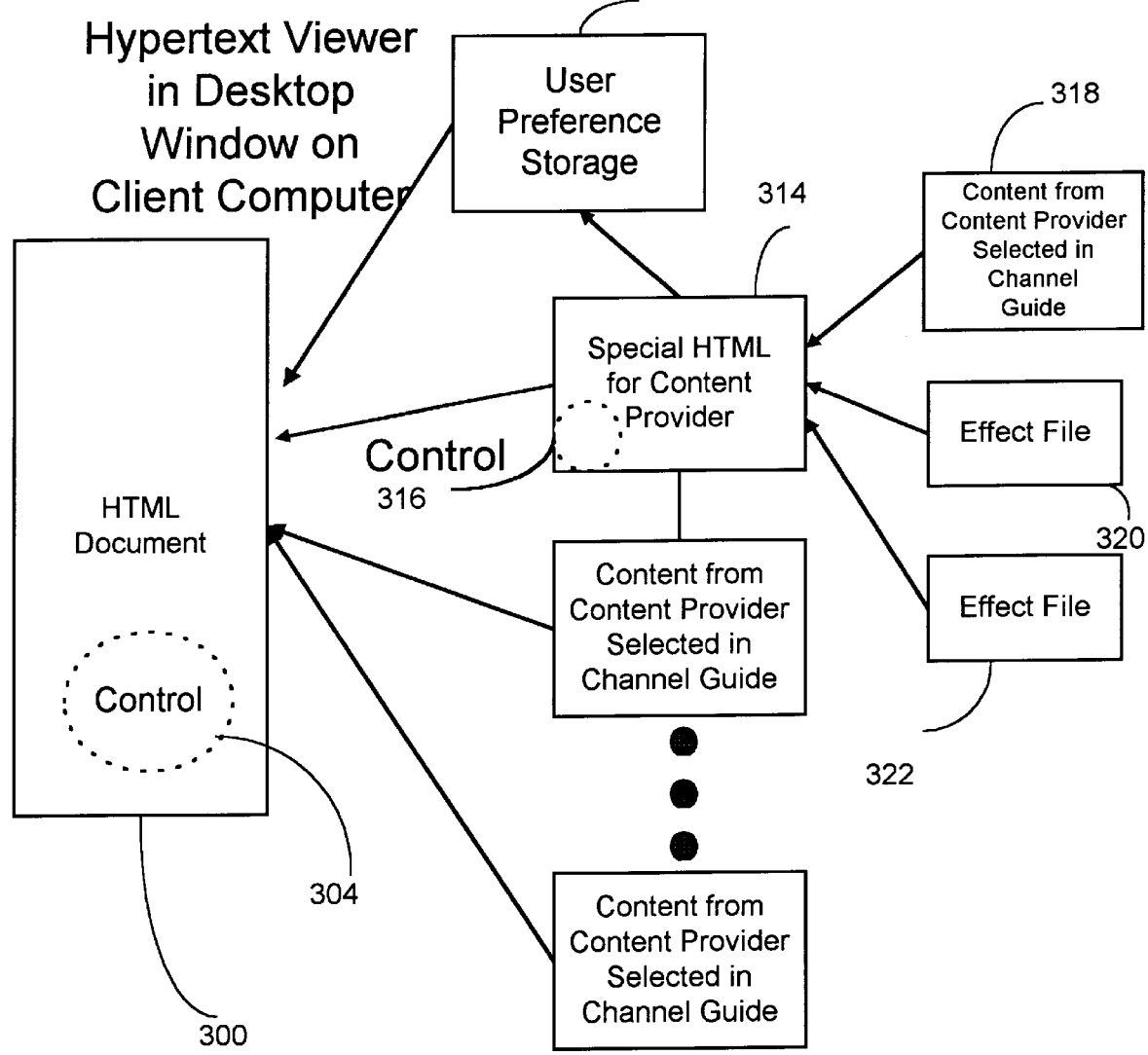
FIG. 12 is an illustration of the desktop viewer sequencing through documents provided by multiple content providers with special effects inserted into one of the documents.

FIG. 12 is a similar diagram to that of FIG. 11, with the addition of a special HTML document 314 containing a control 316. Content providers, such as content provider 318, can use the special HTML document 314 to display their content using different effects, such as effects 320, 322. The effects are easily updated and replaced on the client computer. The control 316 is used to parse information out of the content providers content files and display such information using the effects. The control 316 also stores information, such as a URL, into the user-preference storage 306 so that when a user selects or clicks on a teaser displayed in the viewer, the browser (FIG. 6) is automatically launched and the URL is used to display the appropriate HTML document.

Figure 13:
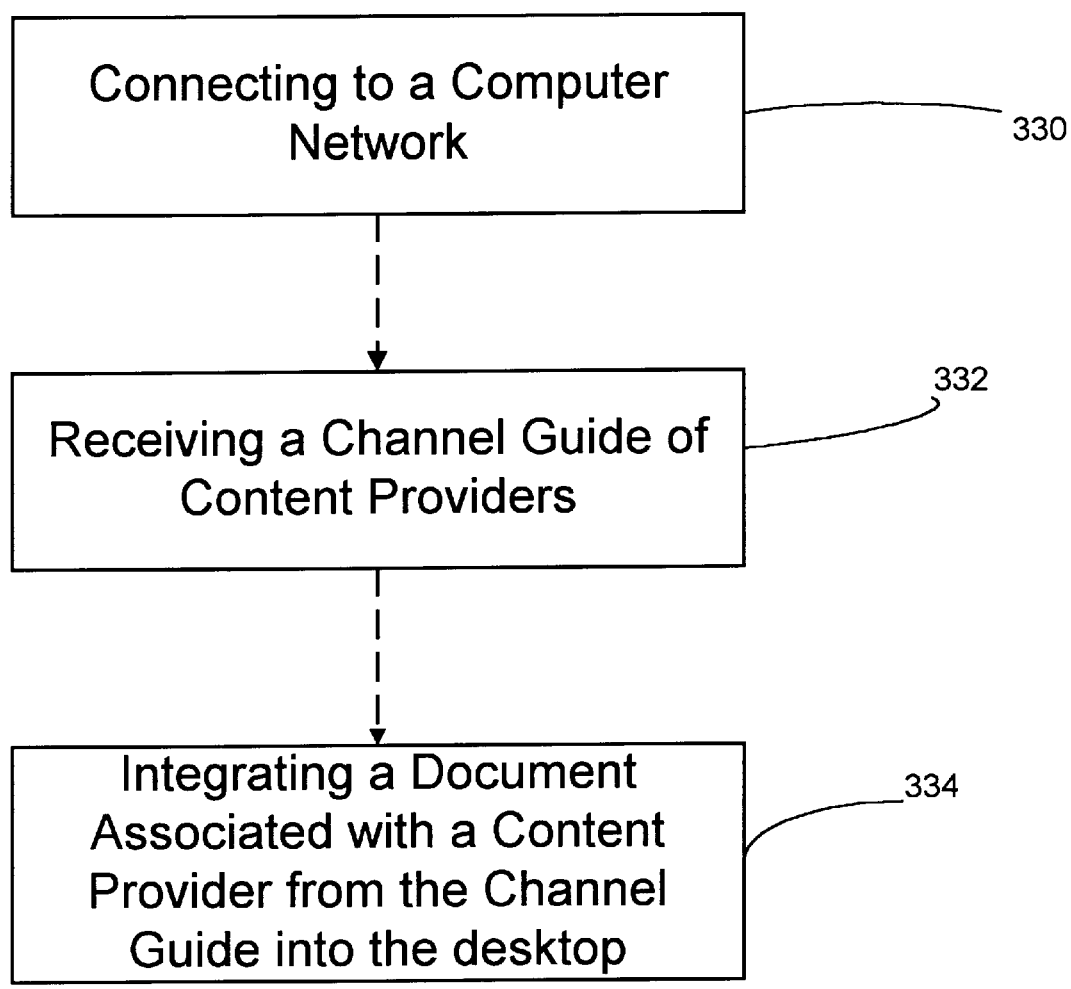
FIG. 13 is a flowchart for implementing the desktop window of FIG. 5.
Figure 14:
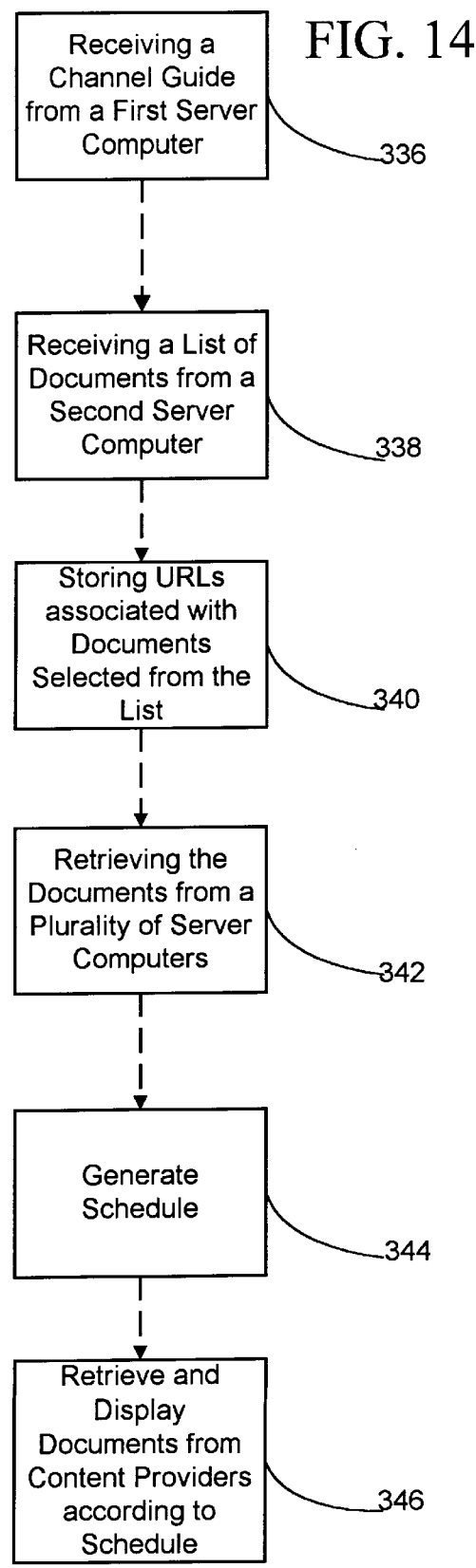
FIG. 14 is a flowchart showing additional steps performed by the system for implementing the desktop window of FIG. 5.

The operation of the active desktop is further described in FIGS. 13 and 14. In FIG. 13, step 330 shows that the client computer connects to a computer network, such as the Internet or an Intranet. This connection is typically made to a default server (i.e., server which provides the main channel guide) upon selecting the channel guide option from the options menu.

In step 332, the client computer retrieves a channel guide listing content providers. The user selects desired content providers and documents preference options for displaying documents associated with the content providers in the active desktop.

In step 334, a document is retrieved from a content provider selected in the channel guide and is integrated into the desktop window. By integrating the document into the desktop, no new window needs to be opened to display the document. Instead, the desktop and the document are displayed in the same window. Because the desktop is not minimizable, the document cannot be minimized, but it can be re-sized like other desktop features (e.g., task bar). In an alternative embodiment the viewer and document can be displayed in a separate window.

FIG. 14 shows additional steps that may be carried out by the client computer 20 to implement the active desktop. In step 336, the channel guide is retrieved from a default server. A URL is associated with the channel guide. When the channel guide option is selected from the options window, the client computer establishes a network connection with a default server designated by the URL. If the user previously accessed the channel guide on the default server, the channel guide displays the currently selected user options by retrieving the options from the user-preference storage (i.e., by using the GetProviderInfo function).

In step 338, upon selecting a desired content provider, the system jumps to a second server computer using a URL embedded within the channel guide. The second server computer provides a list of document preferences so the user can customize which documents are to be displayed on the active desktop. The user can go back to the channel guide and hyperlink to other server computers which also provide a list of document preferences to be displayed.

In step 340, URLs are stored in the user-preference storage according to the content providers and documents the user selects from the channel guide and from the list of documents.

In steps 342, 344, and 346 the active desktop retrieves the URLs from the user-preference storage and uses the URLs to connect to server computers associated with the URLS. The active desktop retrieves a document provided from a server computer and displays the document in the desktop window. The documents retrieved may be in the order they are listed in the user-preference storage. Alternatively, a scheduler may be used that reads the URLs from the registry and generates a schedule for the display of documents.

The active desktop may also include a screen saver which uses selections made from the channel guide to display hyperlinkable content on the display area of the client computer when the client computer is left idle for a predetermined period of time.

Figure 15:
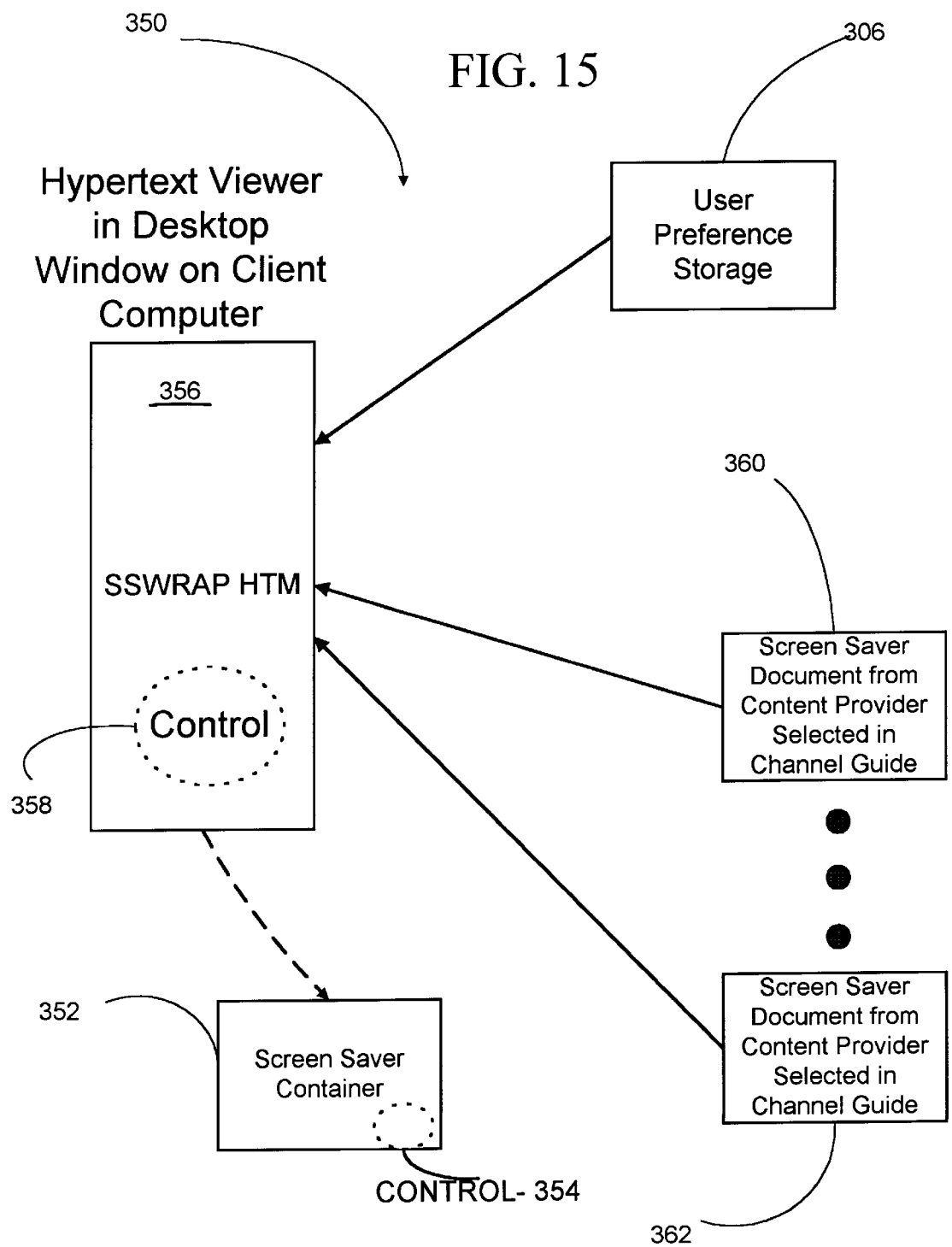
FIG. 15 is an illustration of a screen saver according to the invention using the channel guide of FIG. 7.

FIG. 15 shows a screen saver environment 350 which is controlled by an OLE container 352 hosting a control 354. The control 354 loads a ScreensaverWrap HTML file 356. ScreensaverWrap HTML has a control 358 embedded therein having the GetProviderInfo function. The control 358 reads user-preference storage 306 to obtain URLs saved in the user-preference storage based on selections made from the channel guide. The screen saver time slices screen saver documents, such as documents 360, 362, so that the documents are displayed sequentially. That is, if the content providers are a, b and c, then the screen saver first plays a screen saver document for a, then b, then c, and then repeats the process. Each screen saver document is played for the same amount of time, which is specified in a screen saver settings implemented in the container 352. The screen saver documents are HTML pages and are displayed full-screen. If a user clicks on a hyperlink in the screen saver 330, the browser is displayed to provide further information about the screen saver document.

The SSWRAP.HTM document may alternatively be implemented in a source program (i.e., *.src) or an executable program (i.e., *.exe).

Figure 16:
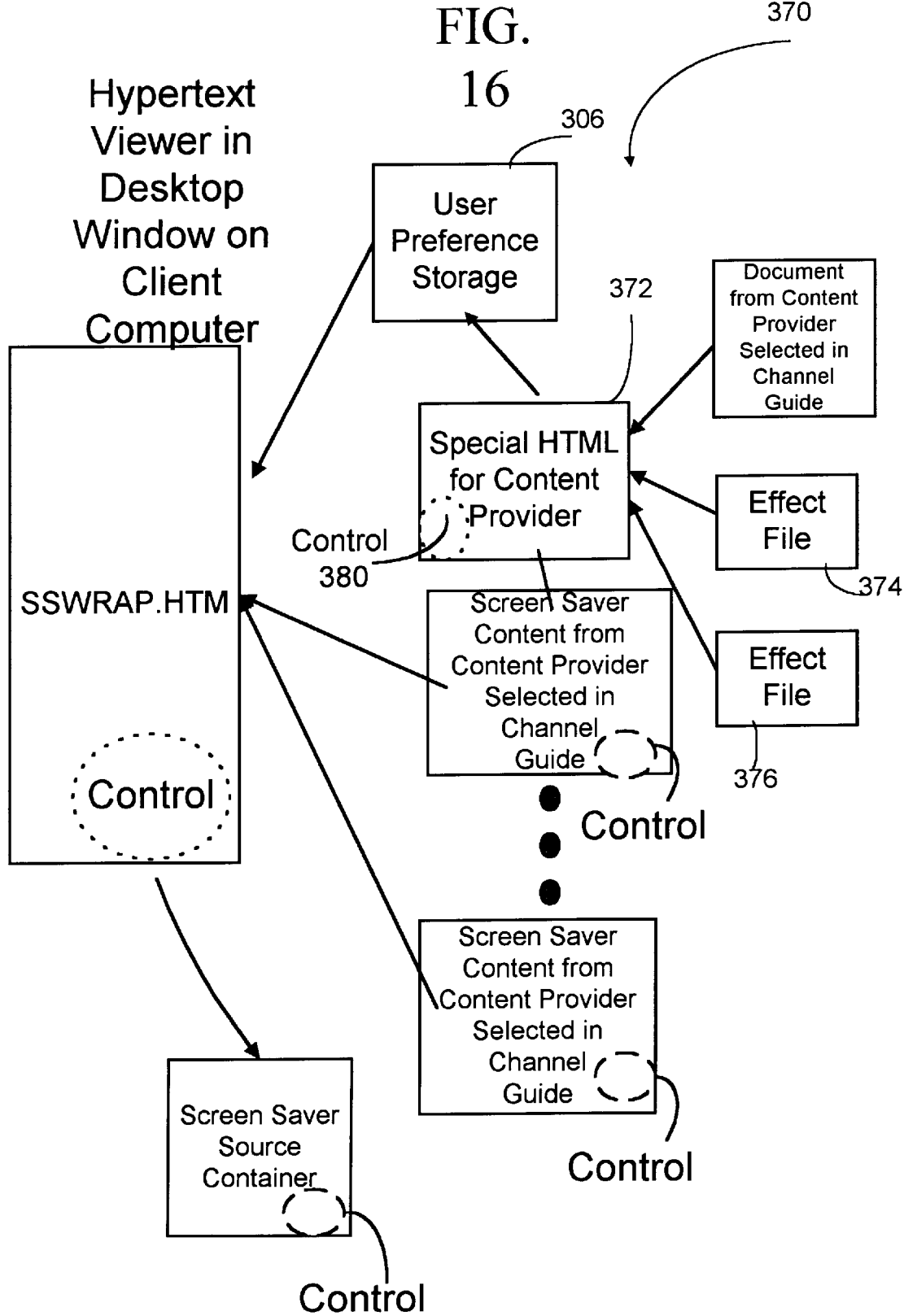
FIG. 16 is an illustration of a special effects screen saver HTML page for incorporating special effects into a screen saver document.

FIG. 16 shows a screen saver environment 370 similar to the screen saver environment described in FIG. 15. However, a special HTML file 372 is provided which is capable of displaying plug-in effects, such as effects 374, 376, along with a document from a selected content provider. The special HTML file contains a control 380 having the same functionality as control 316 in FIG. 12. That is, it is used to store parameter strings in the user-preference storage 306, which are used if a user clicks on an element in the screen saver.

Having described and illustrated the principles of our invention with reference to an illustrated embodiment, it will be recognized that the illustrated embodiment can be modified in arrangement and detail without departing from such principles.

For example, although the viewer 140 is shown in the same window as the desktop, it can also be in a separate window.

It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for displaying a document in a desktop window on a client computer, the method comprising the steps of:

connecting to a computer network from the client computer, the computer network having a plurality of server computers associated with a plurality of content providers;

retrieving a channel guide including a list of content providers from the computer network for allowing a user to select and deselect two or more content providers and stories associated with the content providers, wherein the channel guide remains displayed after the user selects a content provider so that the user can select multiple content providers from the channel guide and the multiple selected content providers remain selected at the same time;

storing the selections that the user made from the channel guide including which stories the user selected;

reading the stored selections and obtaining an address associated with a selected content provider;

retrieving the stored selections including the stories selected in the channel guide; and integrating the retrieved stories into the desktop window so that the stories and the desktop window are displayed in the same window.

2. The method of claim 1, wherein the desktop window includes a first pane for displaying the first document, and a second pane for displaying desktop icons unrelated to the first document.

3. The method of claim 2 wherein the first and second panes of the desktop window are not minimizable.

4. The method of claim 2 wherein the first document is a hypertext document and the first pane of the desktop window includes a hypertext document viewer for displaying the first document.

5. The method of claim 4 wherein the desktop window provides for navigation controls, and the method further comprises:

replacing the first document with a second document received from a content provider in the channel guide and scanning through the first and second documents using the navigation controls.

6. The method of claim 5 wherein the navigation controls include fast forward and reverse and wherein selecting the navigation controls allows the user to view content associated with the stored selections from the channel guide.

7. The method of claim 1 wherein the first document includes a hyperlink referencing a second document and the method further comprising jumping to the second document upon selection of the hyperlink.

8. The method of claim 1 wherein the desktop window is in a windowing environment supporting a plurality of windows displayed on the client computer according to a front-to-back order, wherein windows in the front of the order overlap windows further back in the order, and wherein the desktop window permanently remains the backmost window in the order.

9. The method of claim 1 further including connecting the client computer to a first server computer on the computer network, retrieving the channel guide from the first server computer, selecting a content provider from the channel guide, connecting the client computer to a second server associated with the selected content provider and retrieving a documents preferences listing page relating to documents available for the selected content provider from the second server computer.

10. The method of claim 1 including providing a user-preference storage on the client computer and wherein the channel guide includes a software control for storing information associated with the selected content provider in the user-preference storage.

11. The method of claim 10 wherein the user-preference storage is in a registry of configuration information on the client computer.

12. The method of claim 1 wherein the channel guide is a first channel guide and further including selecting content to be displayed in the desktop window from a second channel guide provided from a different server computer than the first channel guide and integrating addresses from the first channel guide with addresses from the second channel guide and replacing the first document with a second document from a content provider listed in the second channel guide.

13. The method of claim 12 further including storing information associated with the content provider from the second channel guide in a user-preference storage on the client computer.

14. The method of claim 12 wherein the second document includes a software control for storing information associated with the content provider not listed in the channel guide in a user-preference storage on the client computer.

15. The method of claim 1 further including retrieving a second document from the computer network and displaying the first document for a first period of time and replacing the first document with the second document for a second period of time.

16. The method of claim 15 wherein the first document is received from a first server computer and the second document is received from a second server computer.

17. The method of claim 1 including automatically displaying the first document when the client computer remains idle for a predetermined period of time.

18. The method of claim 17 wherein automatically displaying includes overlaying the first document over other windows on the client computer, including overlaying the desktop window.

19. The method of claim 1 wherein the channel guide is a first channel guide retrieved from a first server computer and the method further includes retrieving a second channel guide from a second server computer.

20. The method of claim 19 further including sequentially displaying documents selected from the first and second channel guides in the desktop window.

21. The method of claim 1 wherein the channel guide includes a hierarchical menu interface having a first level including a list of selectable channels, each channel displaying a different topic of information.

22. The method of claim 21 wherein the channel guide includes a second level in the hierarchical menu interface including a list of content providers relating to a channel displayed at the first level.

23. The method of claim 22 wherein the channel guide includes a third level in the hierarchical menu interface including a list of document preferences associated with a content provider displayed at the second level.

24. The method of claim 23 including storing a Uniform Resource Locator (URL) on the second level in the channel guide, the URL pointing to the list of document preferences on the third level.

connecting to a first server computer;

retrieving a channel guide of content providers from the first server computer, the channel guide for allowing a user to select one or more content providers;

connecting to a second server computer associated with a user-selected content provider in the channel guide; and retrieving a document having a hyperlink embedded therein from the second server computer.

25. A method for displaying a hyperlinkable document in a desktop window in a windowing environment on a client computer, the method comprising the steps of:

connecting to a first server computer;

retrieving a channel guide that includes a list of content providers from the first server computer, the channel guide for allowing a user to select one or more content providers from the list and wherein multiple content providers may appear selected at the same time;

storing the selections that the user made from the list of content providers;

reading the stored selections and obtaining an address associated with a second server computer from the stored selections;

connecting to the second server computer associated with a user-selected content provider in the channel guide by using the address obtained from reading the stored selections; and retrieving a document having a hyperlink embedded therein from the second server computer.

26. The method of claim 25, including integrating the document into the desktop window on the client computer so that the document and the desktop window are displayed in the same window.

27. The method of claim 25 including:

connecting to a third server computer associated with a second content provider in the channel guide;

retrieving a second document having a hyperlink embedded therein from the third server computer associated with a content provider selected from the channel guide; and replacing the first-mentioned document with the second document on the desktop window.

28. The method of claim 25 including:

connecting to a third server computer not associated with a content provider in the channel guide;

retrieving a second document having a hyperlink embedded therein from a third server computer; and replacing the first-mentioned document with the second document to display the second document in the desktop window.

29. A method of displaying a hyperlinkable document in a windowing environment on a client computer when the computer is left idle for a predetermined period of time, the method comprising the steps of:

connecting to a computer network from the client computer;

retrieving a channel guide of content providers from the computer network for allowing a user to select one or more content providers;

storing selections made by the user from the channel guide including storing addresses of content providers;

obtaining an address of a content provider from the stored selections;

reading a first document from a selected content provider by using the address obtained from the stored selections, the first document having a hyperlink embedded therein and integrating the first document into the desktop window on the client computer;

after the client computer is left idle a predetermined period of time, overlaying the first document over other windows in the windowing environment.

30. The method of claim 29 wherein the first document is received from a first server computer and the method further includes:

retrieving a second document having a hyperlink embedded therein from a second server computer associated with a second content provider selected from the channel guide page; and replacing the first document with the second document.

31. The method of claim 29 including:

selecting two or more content providers from the channel guide;

retrieving hyperlinkable documents from two or more server computers corresponding to the content providers selected from the channel guide;

after the client computer is left idle a predetermined period of time, sequencing through the hyperlinkable documents by displaying one document at a time and replacing a currently displayed document with a next document in the sequence.

32. A computer system, comprising:

a client computer having a display for displaying a windowing environment including a desktop window with a first pane for displaying content having hyperlinks and a second pane for displaying desktop icons unrelated to the content;

a channel guide for displaying a list of content providers on the client computer display, the content providers providing content having hyperlinks embedded therein from a plurality of server computers connectable to the client computer;

a user-preference storage on the client computer for storing information associated with content providers selected from the channel guide;

means for retrieving content having hyperlinks embedded therein from the plurality of server computers and displaying the content in the first pane of the desktop window on the client computer display.

33. The computer system of claim 32 wherein the means includes establishing an Internet network connection with the server computers.

34. A method for displaying a hyperlinkable document in a windowing environment on a client computer, the method comprising the steps of:

connecting to a computer network from the client computer, the computer network having a plurality of server computers associated with a plurality of content providers;

retrieving a channel guide from one of the server computers, the channel guide including a list of content providers with check boxes associated therewith so that a user can select multiple content providers while continually viewing the channel guide;

storing addresses associated with at least first and second content providers that the user selected from the channel guide;

without any user input, automatically reading the stored address for the first content provider and retrieving a first document from the first content provider on a first server computer;

displaying the first document on the client computer;

waiting a predetermined period of time sufficiently long so that the user can view the first document;

without any user input, automatically reading the stored address for the second content provider and retrieving a second document from the second content provider on a second server computer; and automatically displaying the second document on the client computer.

35. The method of claim 34 further comprising the steps of automatically and sequentially displaying documents from all of the content providers in the channel guide that were selected by the user.

36. The method of claim 35 further including providing fast forward and rewind buttons that allow a user to fast forward or rewind through the sequential display of documents.

37. The method of claim 34 wherein storing addresses associated with content providers selected by the user includes storing the addresses on a server computer.

38. The method of claim 34 wherein storing addresses associated with content providers selected by the user includes storing the addresses on a client computer.

39. The method of claim 34 wherein the channel guide is retrieved from a default server or third party server.

40. A computer-readable medium having computer-executable instructions for performing steps comprising:

connecting to a computer network from the client computer, the computer network having a plurality of server computers associated with a plurality of content providers;

retrieving a channel guide including a list of content providers from the computer network and check boxes associated with each content provider for allowing a user to select and deselect one or more content providers, wherein the channel guide remains displayed after the user selects a content provider so that the user can select multiple content providers from the channel guide, the channel guide allowing multiple check boxes to remain selected even if the user selects other check boxes; and integrating a first document received from a server computer of at least one user-selected content provider into the desktop window so that the first document and the desktop window are displayed in the same window.

41. A computer system for viewing Internet documents provided from two or more server computers, comprising:

a client computer having a display for displaying a windowing environment including a desktop window that displays icons related to applications;

a viewer integrated into the desktop window on the display for displaying Internet documents in the same window as the desktop window; and a channel guide that includes a list of content providers and check boxes adjacent each content provider, the check boxes indicating whether a user selected one or more content providers from the list wherein multiple check boxes can remain selected at the same time and wherein by selecting the content providers the user customizes content displayed in the viewer which is provided by the two or more server computers.

42. A method for displaying a document in a desktop window on a client computer, the method comprising the steps of:

(a) connecting to a computer network from the client computer, the computer network having a plurality of server computers associated with a plurality of content providers;

(b) retrieving a channel guide including a list of content providers from the computer network for allowing a user to select one or more content providers and one or more stories associated with the content providers;

(c) storing the selections that the user made from the channel guide;

(d) reading the stored selections and obtaining an address associated with one of the selected stories;

(e) retrieving the selected story from the content provider;

(f) integrating the retrieved story into the desktop window to display the story to the user; and (g) automatically repeating (d) through (f) to provide an effect of automatically scrolling through the stories selected in the channel guide.

* * * * *

UNITED STATES PATENT AND TRADEMARK OFFICE
CERTIFICATE OF CORRECTION

PATENT NO. : 6,216,141 B1
DATED : April 10, 2001
INVENTOR(S) : Eric John Straub et al.

It is certified that error appears in the above-identified patent and that said Letters Patent is hereby corrected as shown below:

Column 3,
Line 61, "java" should be changed to -- Java --.

Column 12,
Line 67, "are a virtual" should be changed to -- are virtual --.

Column 13,
Line 15, "266 SO" should be changed to -- 266 so --.

Column 18,
Lines 51-58, should be deleted.

Signed and Sealed this

Twenty-fifth Day of March, 2003

JAMES E. ROGAN
*Director of the United States Patent and Trademark Office*